Sept. 8, 1925.  1,553,216
W. M. CLARK
SHEAF SHOCKER
Filed Nov. 12, 1919   16 Sheets-Sheet 8

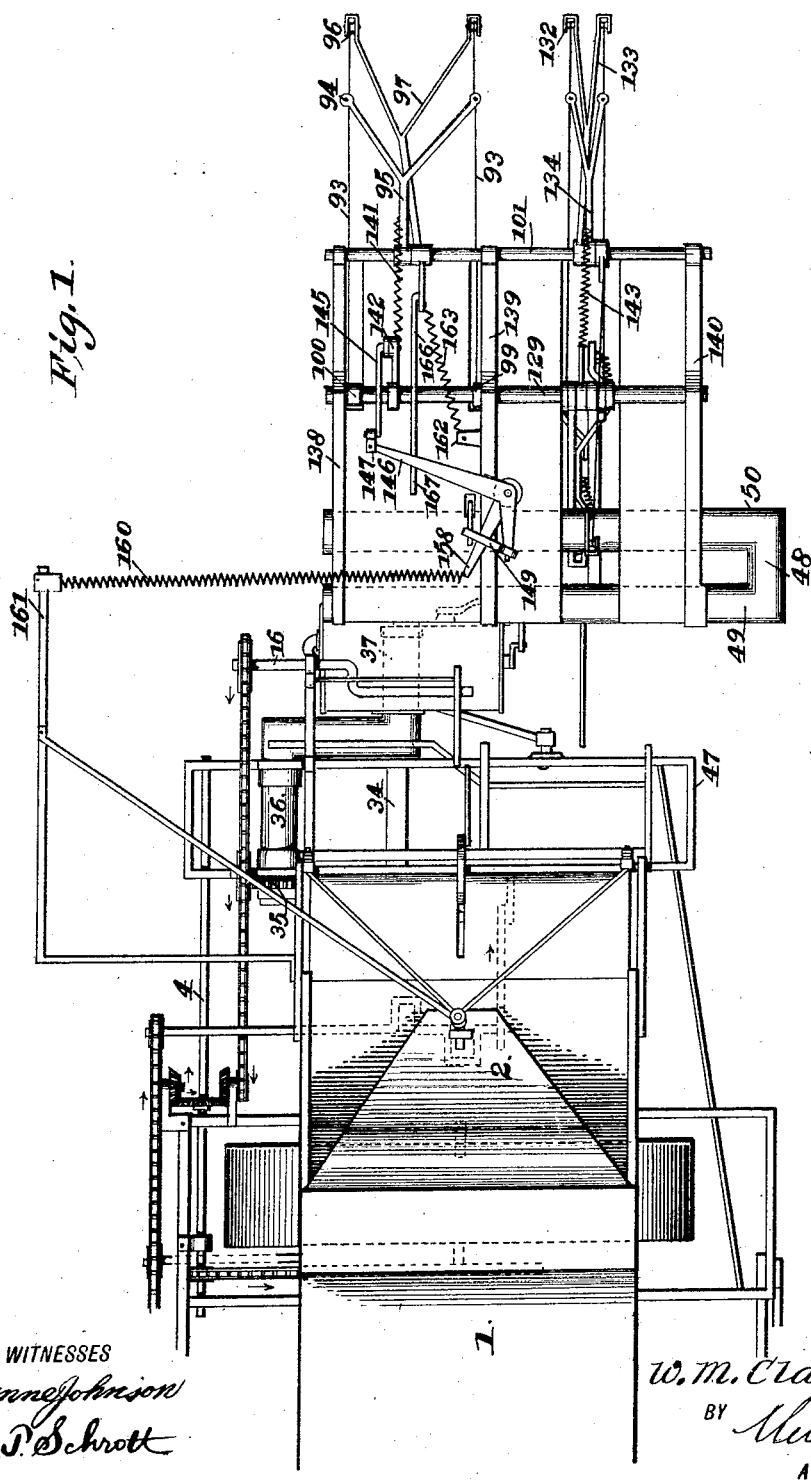

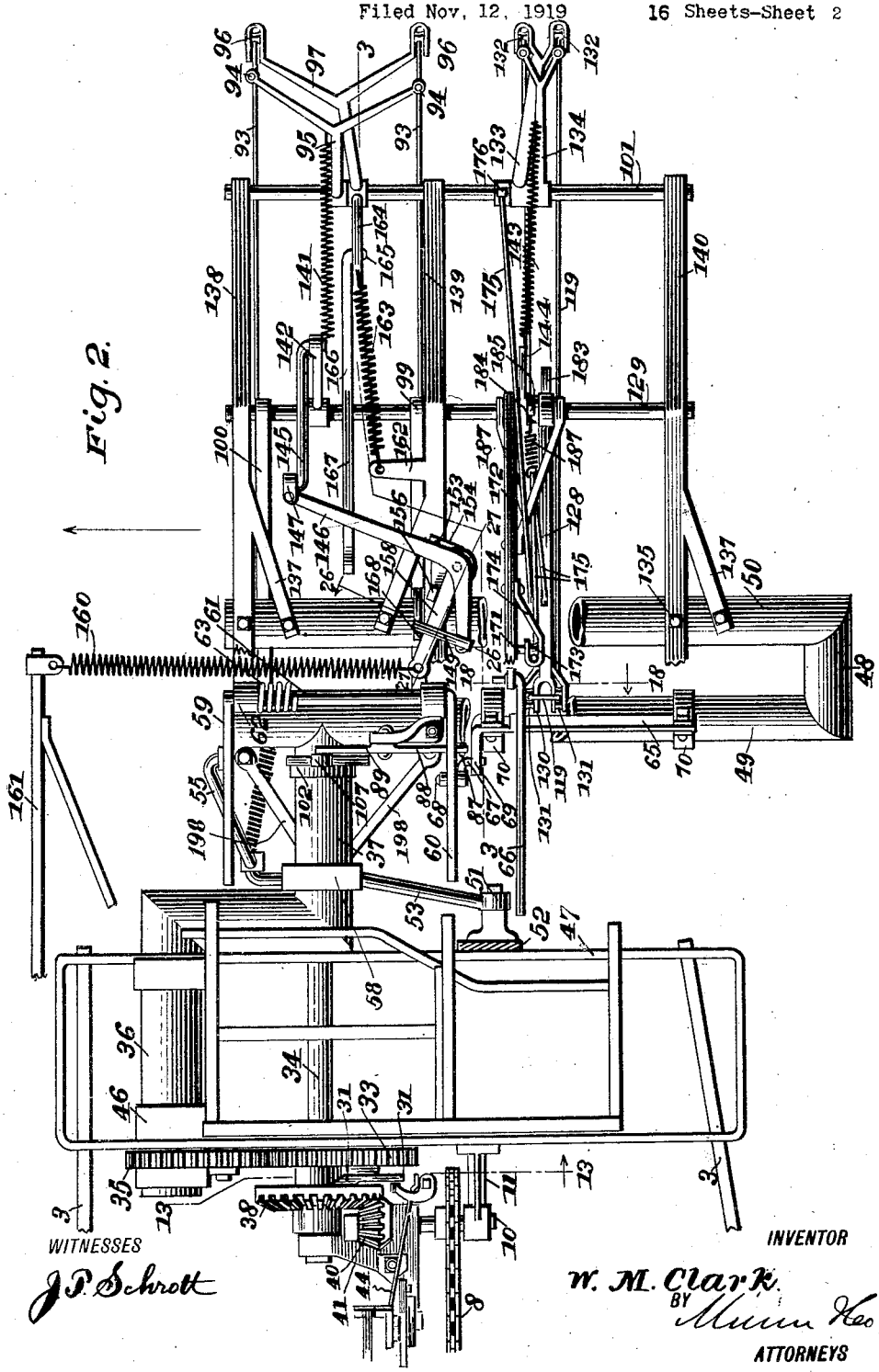

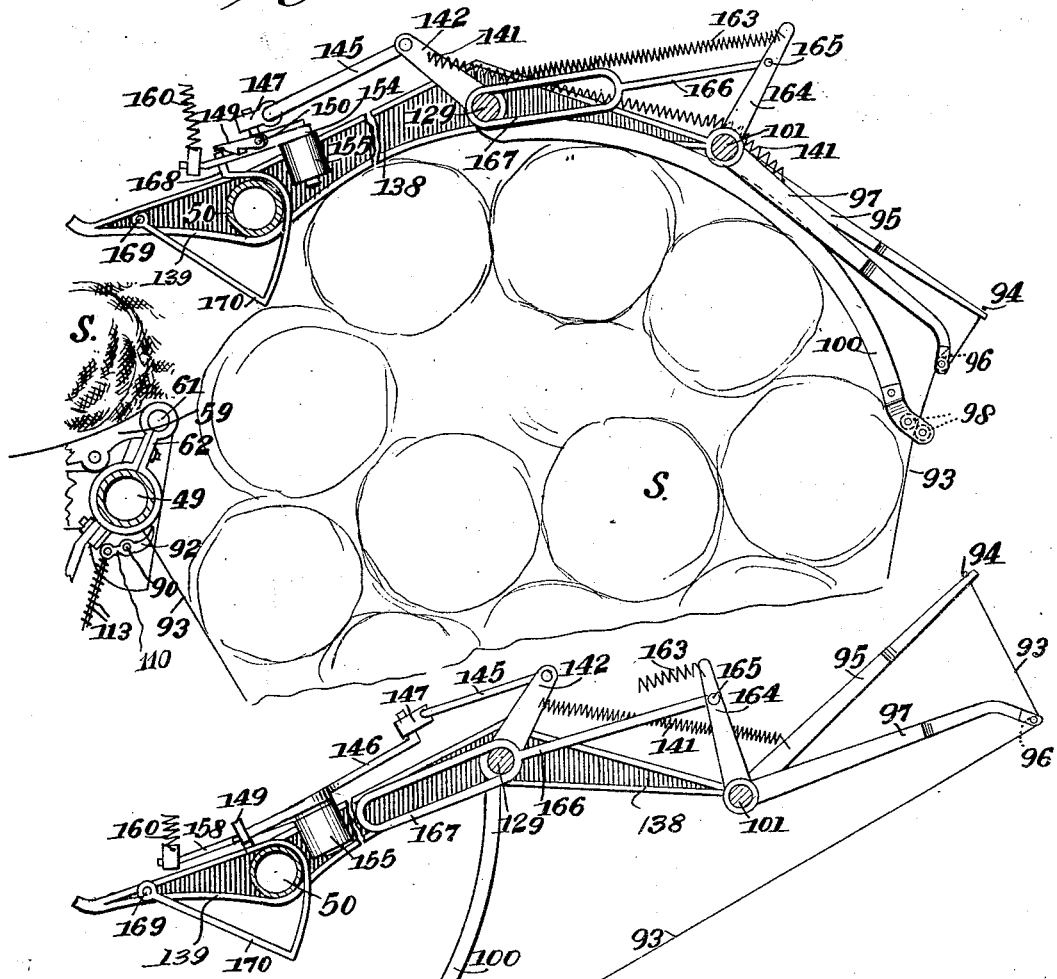

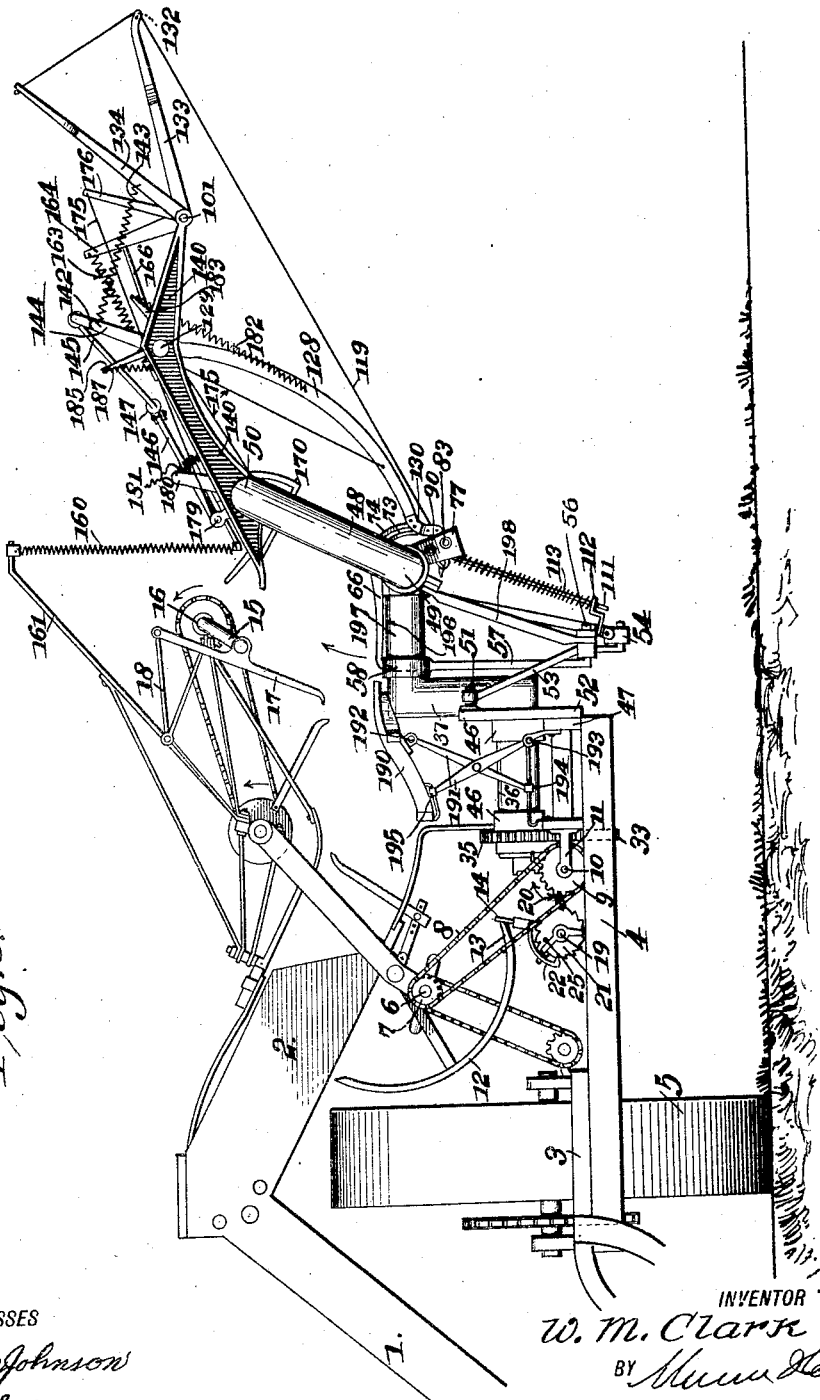

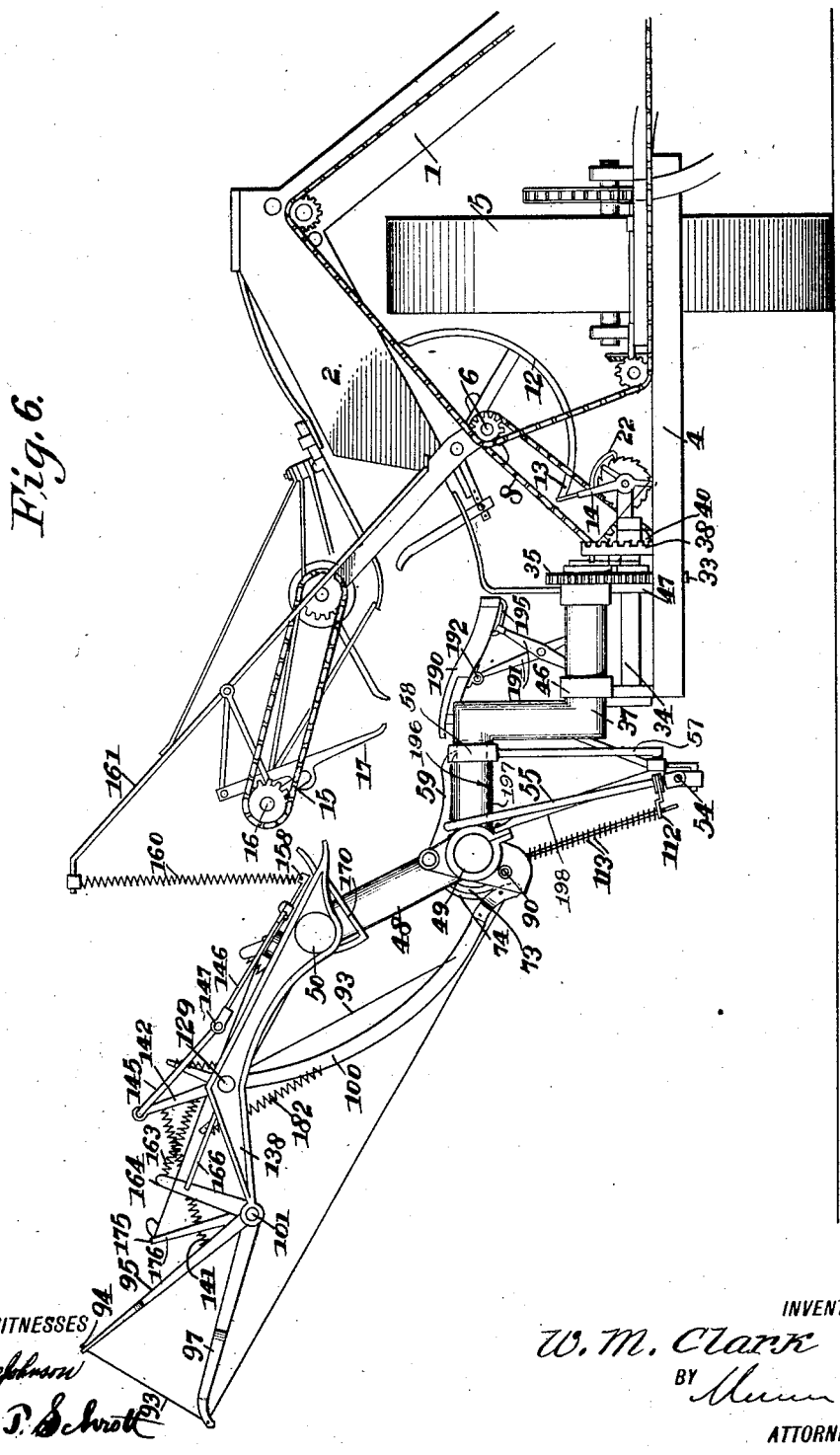

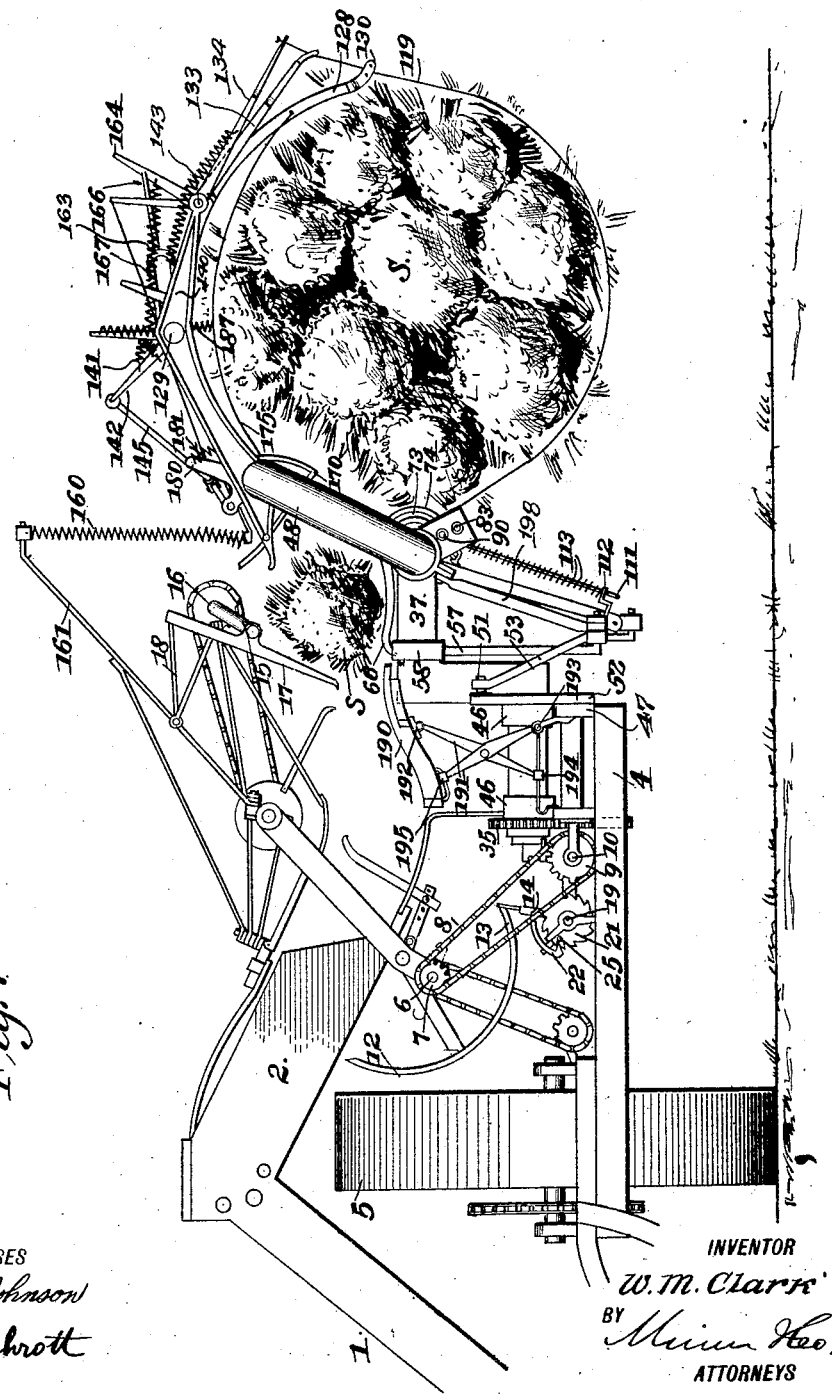

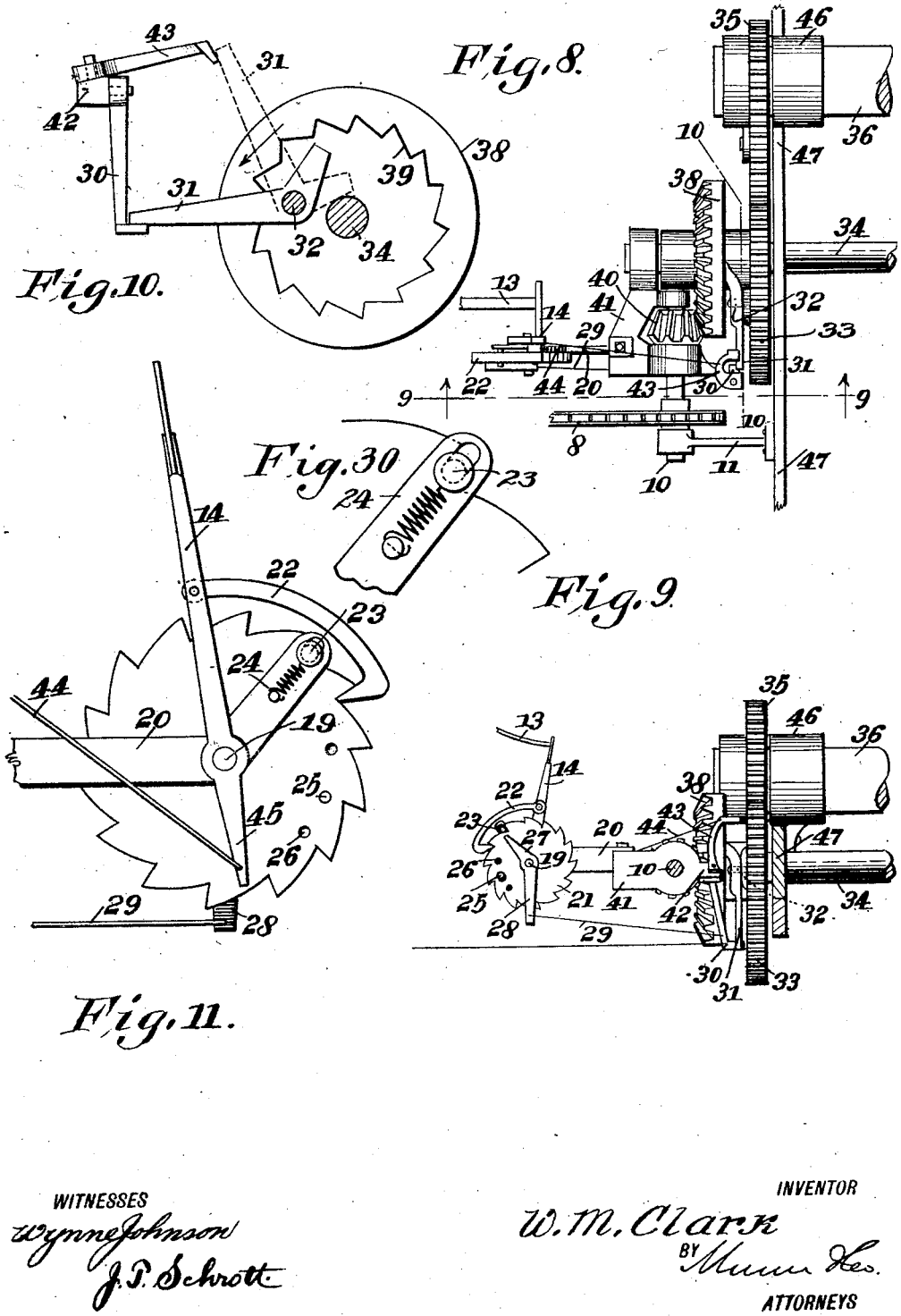

WITNESSES
INVENTOR
W. M. Clark
BY
ATTORNEYS

Sept. 8, 1925.

W. M. CLARK

SHEAF SHOCKER

Filed Nov. 12, 1919

WITNESSES

INVENTOR
W. M. Clark
BY
ATTORNEYS

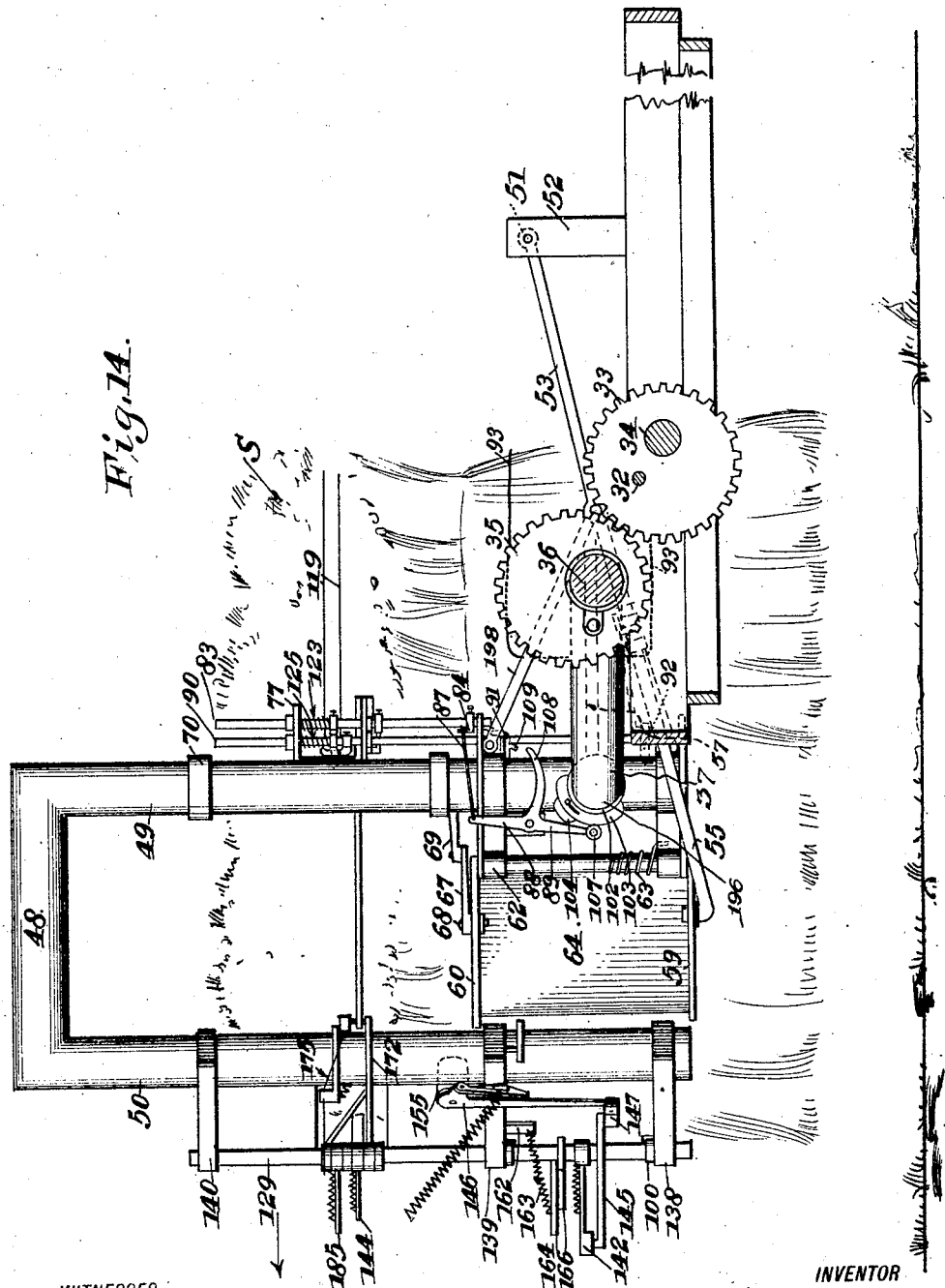

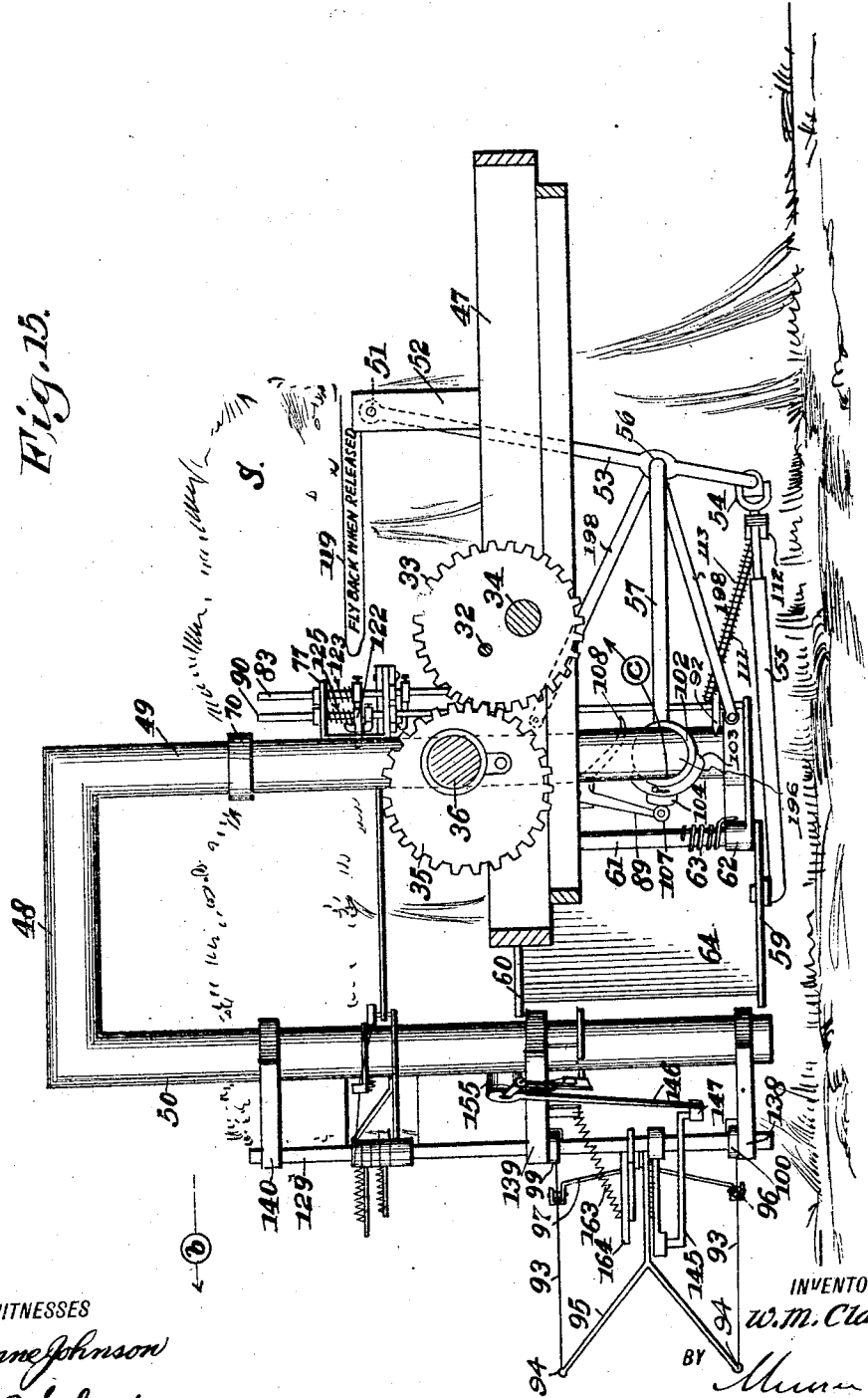

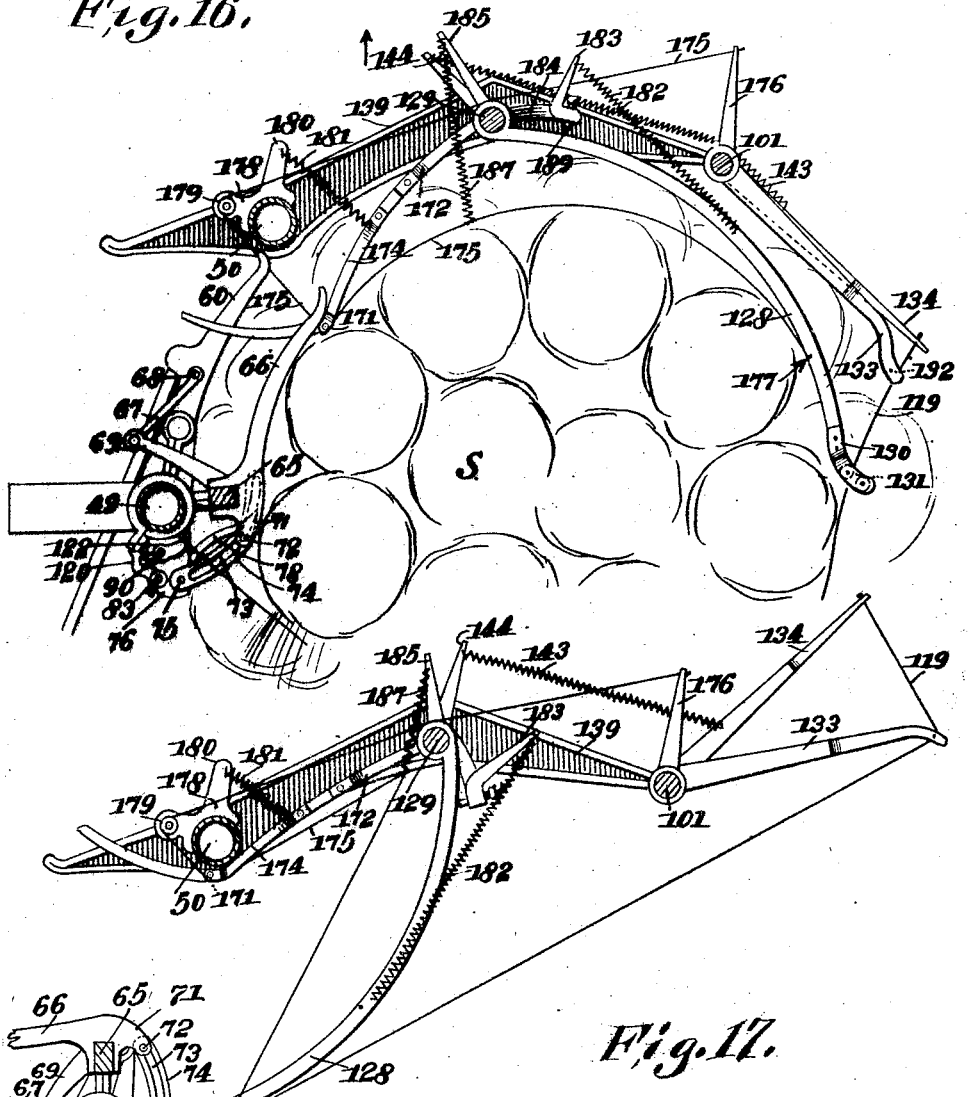

Sept. 8, 1925.

W. M. CLARK

SHEAF SHOCKER

Filed Nov. 12, 1919

WITNESSES
Wynne Johnson
J. T. Schrott

INVENTOR
W. M. Clark
BY
Munn & Co
ATTORNEYS

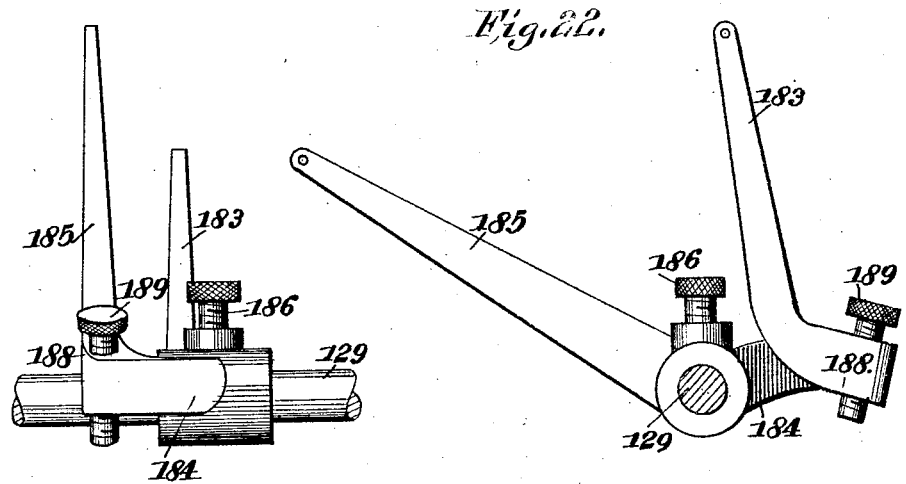
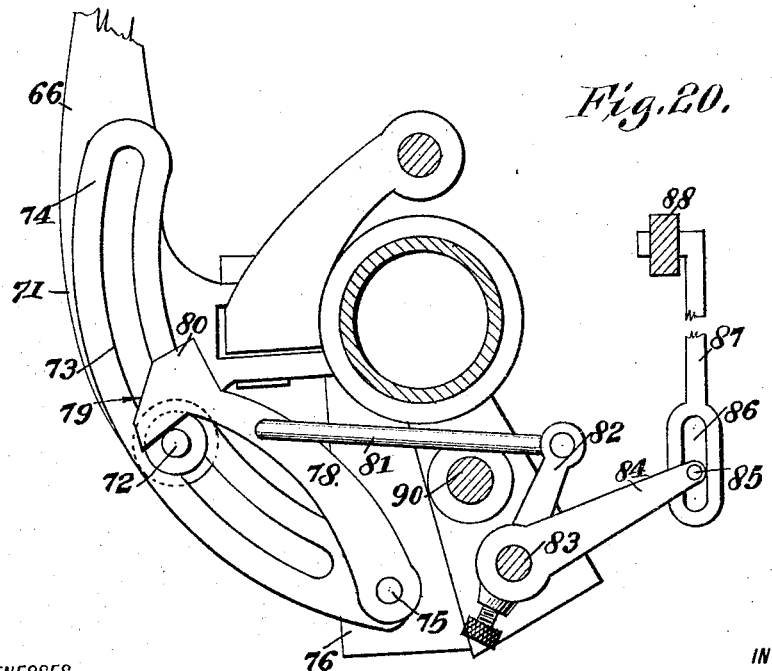

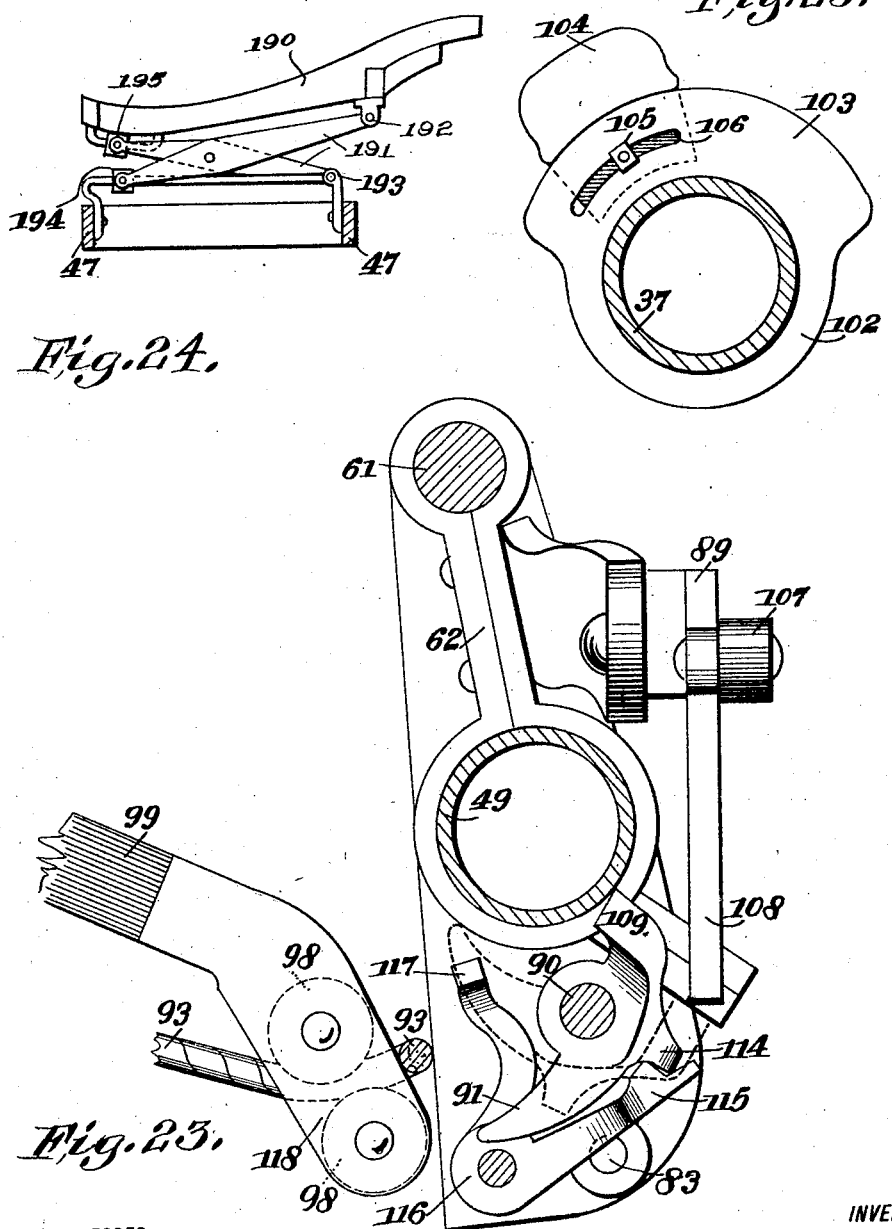

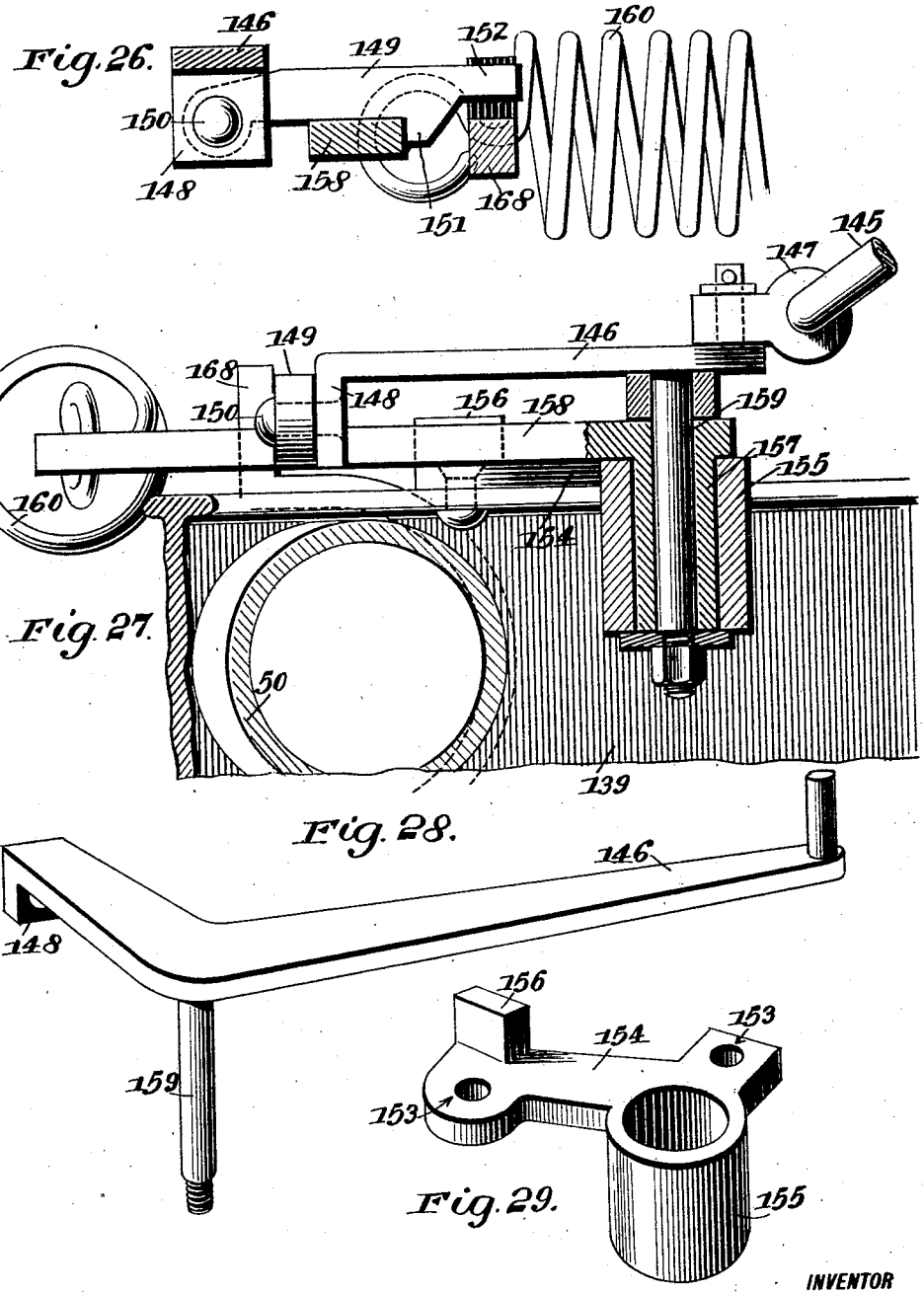

Patented Sept. 8, 1925.

1,553,216

UNITED STATES PATENT OFFICE.

WILLIAM MORGAN CLARK, OF MINOT, NORTH DAKOTA.

SHEAF SHOCKER.

Application filed November 12, 1919. Serial No. 337,381.

*To all whom it may concern:*

Be it known that I, WILLIAM MORGAN CLARK, a citizen of the United States, and a resident of Minot, in the county of Ward and State of North Dakota, have made certain new and useful Improvements in Sheaf Shockers, of which the following is a specification.

My invention relates to improvements in sheaf shockers, and it consists in the constructions, combinations and arrangements herein described and claimed.

The foremost object of my invention is to provide a shock former to be attached to any reaper and binder, to form a predetermined number of discharged sheaves into a shock or bundle and automatically set the bundle on the ground when it contains the requisite number of sheaves.

A further object of the invention is to provide a sheaf shocker which is automatically tripped to the shock discharging position when the last of a predetermined number of sheaves has been discharged from a binder.

A further object of the invention is to provide a round shock forming attachment for binders.

A further object of the invention is to provide in a sheaf shocker as described above, tripping means actuated by the sheaves as they are discharged thereinto, for inaugurating the shock setting function when the requisite number of sheaves has been gathered thereby.

A further object of the invention is to provide an improved shock forming and setting apparatus in which the bottoms of the sheaves are caused to spread out preparatory to the final setting action, so as to provide a stable base for the shock.

A further object of the invention is to provide a shock forming apparatus as described, embodying means for permitting the bottoms of the sheaves to spread out preparatory to the final setting operation and causing the shock to be set down with a quick motion to jam the sheaf ends into the ground.

A further object of the invention is to provide a sheaf shocker for binders, arranged to set the formed shocks in the rear of the shocker without causing any hindrance or obstruction to either the binder or the sheaf shocker in continuing said movement.

Other objects and advantages will appear in the following specification, reference being had to the accompanying drawings, in which:—

Figure 1 is a plan view showing the improved shocker attached to the discharge end of a binder, Figure 2 is a detail plan view of the improved sheaf shocker on a slightly larger scale, Figure 3 is a detail section taken substantially on the line 3—3 of Figure 2, showing the shock form in the initial or empty position, Figure 4 is a similar view showing the shock form filled and about ready to commence the setting operations, Figure 5 is a rear elevation of the improved shocker, showing it attached to the discharge end of a binder as in Figure 1, Figure 6 is a front elevation of the improved shocker on the binder, Figure 7 is a rear elevation showing the shock form filled, with the exception of the last bundle, Figure 8 is a detail plan view of the shock form tripping mechanism, Figure 9 is a detail cross section on the line 9—9 of Figure 8, Figure 10 is a detail section taken substantially on the line 10—10 of Figure 8, showing the drive ratchet and cooperating dog, Figure 11 is a front elevation of the form tripping bracket, shown in rear elevation in Figure 9, Figure 12 is a side elevation of the sheaf shocker, looking in toward the binder to which it is attached, Figure 13 is a side elevation showing the shock form filled and in readiness for the tripping and setting operations, this view being taken from a position substantially along the line 13—13 in Figure 2, Figure 14 is a similar view showing the shock about to be set up, at which time the lower cords are released, Figure 15 is a similar view illustrating the final action in which the shock is set on the ground and the upper cords are released, Figure 16 is a detail horizontal section showing the shock in the set up position in Figure 15, Figure 17 is a somewhat similar view showing the parts as having returned to the original position for the formation of another shock, Figure 18 is a detail sectional view taken substantially on the line 18—18 of Figure 2, showing the gripping mechanism and associated parts at the place of attachment of the upper cords.

Figure 19 is a detail section taken substantially on the line 19—19 of Figure 18, showing how the upper cord loop is applied to its hook, Figure 20 is a detail cross section taken substantially on the line 20—20 of Figure 18, Figure 21 is a detail front elevation of a spring holder described below, Figure 22 is a side elevation thereof, Figure 23 is a detail section taken substantially on the line 23—23 of Figure 12, showing the lower cord about to be re-engaged by its hook.

Figure 24 is a detail view of the depressible table,

Figure 25 is a detail view of the cord releasing cam,

Figure 12:
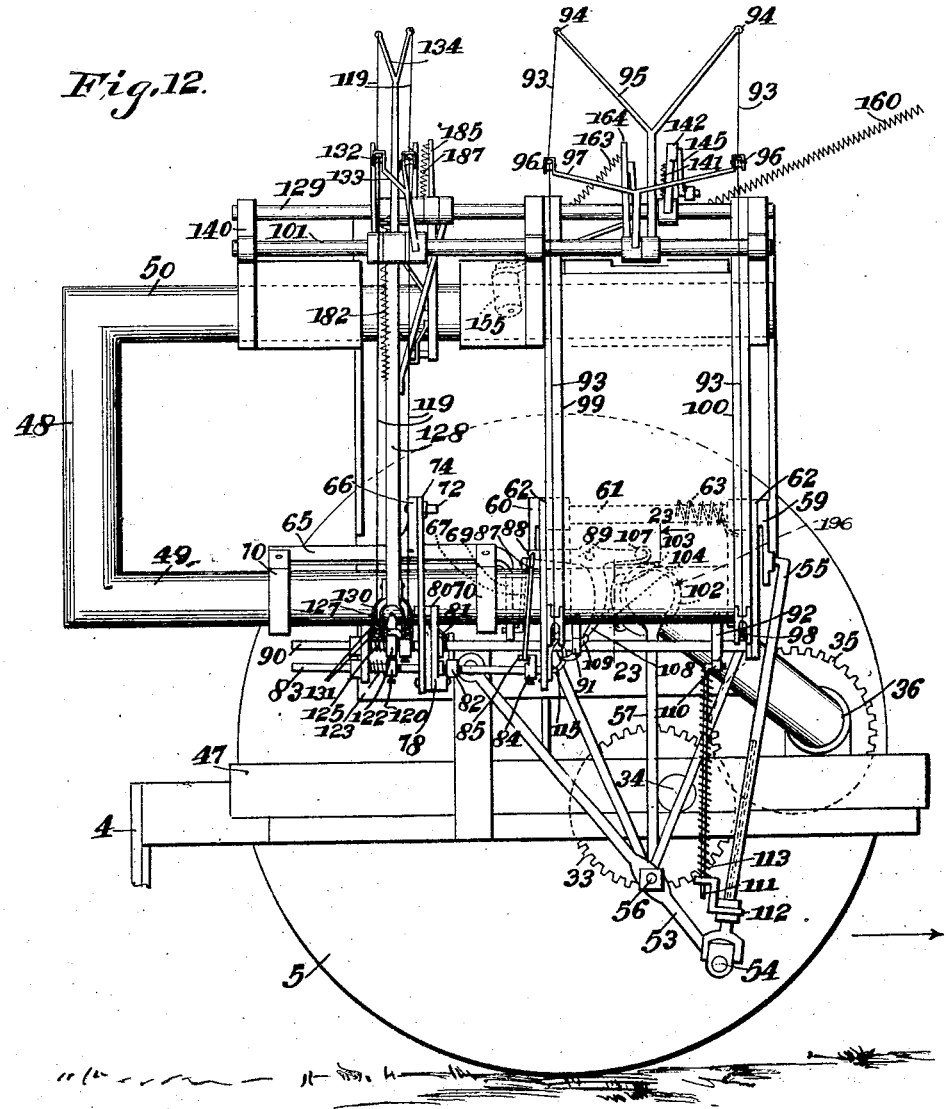
Figure 13:
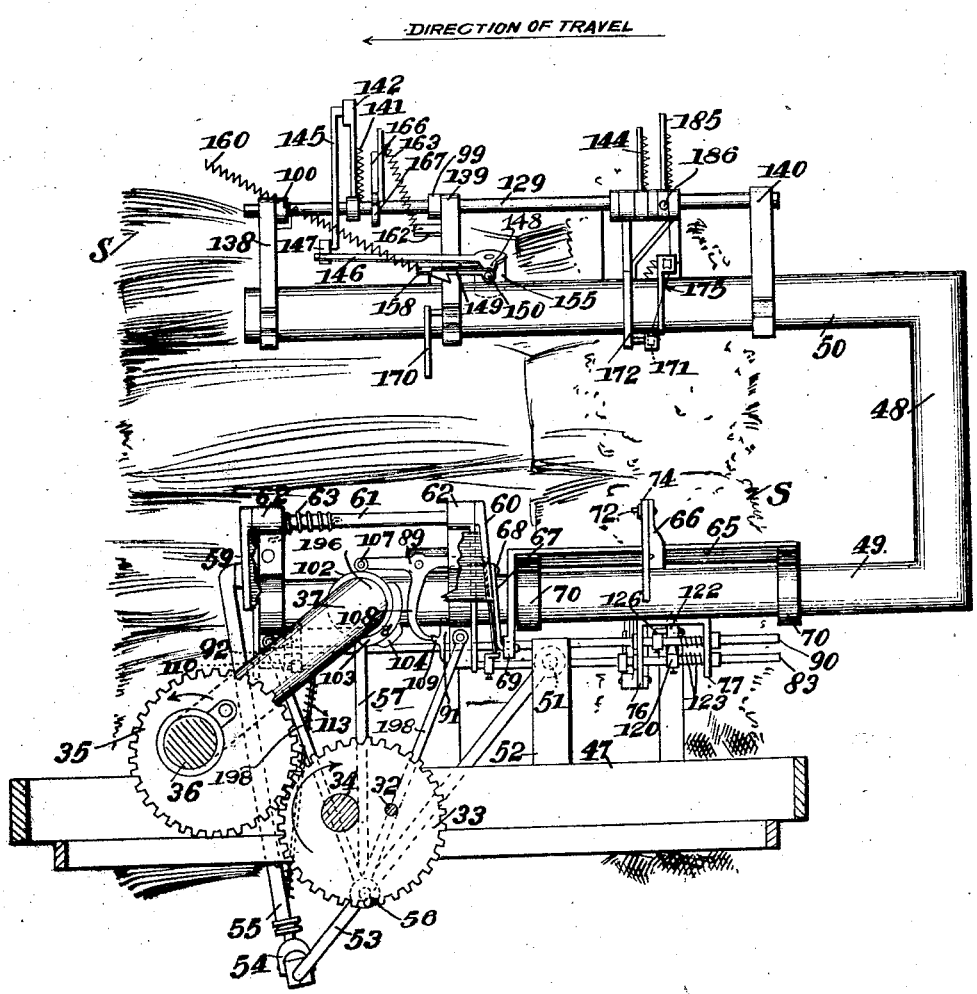

Figure 26 is a detail sectional view taken substantially on the line 26—26 of Figure 2, Figure 27 is a similar view taken substantially on the line 27—27 of Figure 2, Figure 28 is a detail perspective view of the bell crank 146 illustrated in Figures 2 and 27, Figure 29 is a detail perspective view of the stop bearing 154.

Figure 30 is a detail view of the arm 24 showing the spring stop referred to below.

There are six major subjects under which the invention is described below, the description being subdivided in this manner in order that the various operations may more readily be understood. These subjects are described in the following order. (1) Manner of attachment and filling the shock form, (2) the automatic shock setting up act and mechanism, (3) forcing in the last bundle, (4) releasing the lower shock binding cords, (5) releasing the upper shock binding cords, and (6) returning the shock form empty. The description of these various acts is in each case preceded by a description of the particular mechanism employed, the concluding resumé constituting a brief review of all of the above operations. Attention is first directed to the manner of attachment and filling of the shock form. Attached to the right or discharge side of any reaper and binder 1, as in Figures 1, 2, 5 and 7, is the improved shock forming apparatus which receives the sheaves or bundles S as they are discharged at the discharge throat 2. For the purposes of this attachment of the shock forming apparatus, the frame 3 of the binder includes a suitably braced extension 4 on which the mechanism is supported.

The mechanism of the shock forming apparatus is relatively light so that no great additional burden is imposed on the main drive wheel 5 of the binder. In Figures 1, 2, 5 and 7, the binder with its attached shock forming apparatus is moving from the observer. The stubble side is on the right while the grain side is on the left. A completely formed shock is periodically set down on the field and on the stubble side at the right. All this will become more clearly apparent in the following description, but it may observed in connection with Figure 7 that the almost completely formed shock therein illustrated, is turned over from the observer so that the shock is stood erect on the stubble side of the machine.

That portion of the binder 1 which is concerned with the shock forming mechanism, consists of the packer shaft 6 which carries a sprocket 7 with a chain 8 applied to the driven sprocket 9 on the suitably journaled setting shaft 10. The setting shaft 10 is continuously revoluble in bearings 11, by the motion derived from the packer shaft.

Suitably operated by mechanism, the details of which are not disclosed, is an oscillating needle 12, so called because of the particular function it performs in tying up separate bundles as the grain is conveyed to the discharge throat 2. As can be plainly seen from the drawings, the upper end of the needle 12 enters and retracts from the throat 2. At nearly the end of said retraction of the needle, which fact indicates that a new bundle S has been tied, the heel 13 of the needle 12 strikes the erect pawl arm 14 of the trip mechanism described under the third paragraph below.

Mounted in suitable bearings above the discharge throat 2, is a pusher shaft 16, which has a crank 15 for actuating the pusher 17. This pusher has a rotary motion by virtue of the connection of the pusher crank, and also has pushing action by virtue of the link 18 which is pivoted thereto at the upper end. The operation is obvious; as the successively tied bundles come along, the pusher 17 moves them into the inlet of the shock form as illustrated to advantage in Figure 7.

The automatic shock setting up act begins when the requisite number of bundles or sheaves S has been packed into the shock form. This requisite number is predetermined and is adjustable to suit the particular requirements. Ordinarily, the shocker is set to hold, say twelve bundles, but this number may be varied by this means:

Mounted on the fixed shaft 19, which in turn is carried by the bracket 20, is the tripping ratchet 21, capable of moving the distance of a tooth at a time through the actuating pawl 22 as the arm 14, on which the pawl is mounted, is repeatedly struck by the heel 13 of the needle 12. The pawl arm 14 oscillates on the tripping shaft 19 and as the ratchet 21 is advanced a tooth at a time, it is successively caught and held by a suitable spring stop 23, which is operatively mounted in the extension 24 on the bracket 20.

A trip pin 25, either fixed in a predetermined position or capable of being inserted in any one of a series of openings 26, gradually moves around by the step-by-step movement of the tripping ratchet 21, until it engages the heel 27 of the freely mounted trip arm 28 which has a connection 29 to the holding lug 30 normally beneath the outer end of the drive pawl 31.

The drive pawl or dog 31 is pivoted at 32 to the initiator or gear 33, which is eccentrically mounted on the shaft 34. This gear meshes with and drives the crank gear 35, which is eccentrically mounted on the trunnion or stub shaft 36 of the erector crank 37.

Normally, the gears 33 and 35 are inactive, that is to say, while the shock form filling operation is in progress, the gears 33 and 35 do not move. It is not until the drive pawl 31 is released by the holding lug 30, that these gears are caused to turn, and when the former act takes place, a positive connection between the initiator gear 33 and the continuously rotating drive ratchet 38 is established by the engagement of the dog or drive pawl 31 with the internal teeth 39 of the drive ratchet 38.

As clearly shown in Figures 8, 9 and 10, the drive ratchet 38 has bevel gear teeth on the outside and the teeth 39 on the inside. The bevel pinion 40 meshes with the gear teeth of the ratchet 38 and continuously drives the ratchet 38, this continuous drive being obtained through the chain connection 8 with the setting shaft 10, as described above. It is to be observed in Figure 8, that the bevel pinion 40 is housed between the members of a casting 41, which is so constructed as to afford a bearing support not only for the setting shaft 10, but also for the shaft 34 on which the initiator gear 33 is mounted.

So far it can be readily understood that when a predetermined number of bundles or sheaves S have been packed into the shock form, the trip pin 25 will by that time have worked around into engagement with the heel 27, so that the connection 29 is pulled and consequently the holding lug 30 is disengaged from the drive pawl 31, permitting the latter to move or fall into engagement with the internal teeth 39 of the member 38. This member 38 being continuously rotatable, causes the initiator gear 33 to rotate in the same direction by virtue of the connection afforded by the drive pawl 31, whereupon the crank gear 35 and crank 37 are caused to move forwardly or away from the observer in Figure 7, so as to set the shock on the ground.

A suitably disposed extension 42 of the casting 41, provides the pivotal support for the holding lug 30 and the stop lug 43. This lug normally lies in the path of movement of the drive pawl 31 when this pawl is released by the lug 30 as pointed out above, so as to engage the pawl 31 when it comes around and disengages the heel of the pawl from the teeth 39, thus automatically stopping the setting up act of the form. It must be understood that when the drive pawl 31 is disengaged, as stated, the initiator and crank gears 33, 35 respectively come to rest, and the shock form at that time assumes the position in Figure 15.

A connection 44 from the stop lug 43 to the extension 45 of the pawl arm 14, causes the retraction of the lug 43 from beneath the drive pawl 31, when the needle 12 returns from a binding act while the shock form is still in the position in Figure 15. The significance of this operation becomes more apparent below.

Journals 46, forming a part of a rectangular frame 47 reaching across the extensions 4, support the trunnion or stub shaft 36 of the erector crank 37. This frame also provides the support and means of attachment of other parts of the mechanism, as shown in the various drawings and clearly described below.

Forcing in the last bundle takes place as the shock form moves to the setting up position, there always being a bundle or sheaf S in place ready to be forced in. The action which then takes place involves the following mechanism:

Carried by the arm 196 (Figs. 5, 6, 12, 13, 14 and 15) of the erector crank 37, is the U-shaped form hanger 48, which includes the lower and upper tubes 49, 50. The form hanger may turn in respect to the crank arm 196 during a period of its movement, for example when traversing the distance between the positions in Figures 14 and 15. For this purpose the hanger 48 has a sleeve 197 which fits on the arm 196. The hanger is held in place on the crank arm by brackets 198 which at one end are fastened to the hanger (Figure 15) and at the other end have common pivotal connection at 56 with the tilting rod 57 upon the mounting rod 53. Pivoted at 51 to a bracket 52 on the frame 47, is the mounting rod 53, which at its opposite end has a universal joint connection 54 to the telescopic rock rod 55, and adjoining the extremity has a common pivot bolt 56 (Figure 12) which constitutes the common pivot mentioned.

The form tilting rod 57, has a collar 58 applied to the erector crank 37 as shown in Fig. 5 so as to turn in respect to the erector crank arm as the form hanger moves from the position in Figure 14, through the position in Figure 15 and back into the original position in Figures 2 and 12. Consider Figures 13, 14 and 15, which are views looking outwardly toward the stubble side of the field from a position directly in back of the initiator and crank gears 33, 35. As the erector crank moves toward the left, which is in the direction of motion of the machine, the shock form consequently moves with it; the rod 53 moves forwardly and upwardly to the position in Figure 14, and since this position shows the extremity of upward movement of the rod 53, it follows that the tilting rod 57, which is pivoted thereto, necessarily causes the form hanger 48 to tilt into the vertical position shown.

Jointed to the free end of the telescopic rock rod 55 is one of a pair of force arms 59, 60. These are integrally or otherwise carried by the rock shaft 61, which is journaled in bearings 62 in turn carried by the lower tube 49. As the shock form rotates to the position in Figure 14, the force arms 59, 60 move from the normal sheaf receiving position as for example in Figure 7, to the forcing or form closing position in Figure 14. The forcing act is thus accomplished by the stretching out of the telescopic rock rod 55.

The act of thus closing the forcing arms 59, 60 is against the tension of the spring 63, which is coiled around the rock shaft 61 and secured at its ends respectively to the shaft and an adjacent bearing. A sheet metal plate 64 extends across the arms 59, 60 as shown, to insure the forcing in of the bundle then in position.

When the force arms 59, 60 are moved inwardly as described above, the bar 65 carrying a third force arm 66, is turned on the lower tube 49 through the crank or link 67 which is pivoted at 68 to the arm 60 and at the free end joins the arm 69 on the turnable bar. The bar 65 has collars 70, sufficiently loose on the tube 49 to permit turning. The arm 66 assists in forcing the bundles in.

Carried by the heel 71 of the third force arm, as in Figures 16 and 20, is a latch pin 72 which occupies a position within the arcuate slot 73 of an arcuate guide 74. This guide is pivotally mounted at the lower end as at 75 to one arm 76 of a U-shaped bracket, which includes another arm 77 as clearly shown in Figure 18.

As the force arm 66 is moved forwardly to the form closing position, the latch pin 72 travels downwardly in the arcuate slot 73 and catches behind the head of the latch 78, pivoted on the same rivet 75 on which the guide 74 is mounted. The head of the latch is beveled at 79 to cause the displacement of the head by the pin 72 on the downward movement. When once the pin 72 is caught behind the head, the arm 66 and the force arms 59, 60 are held to the closed position by virtue of the link connection 67 already described.

Figure 18:
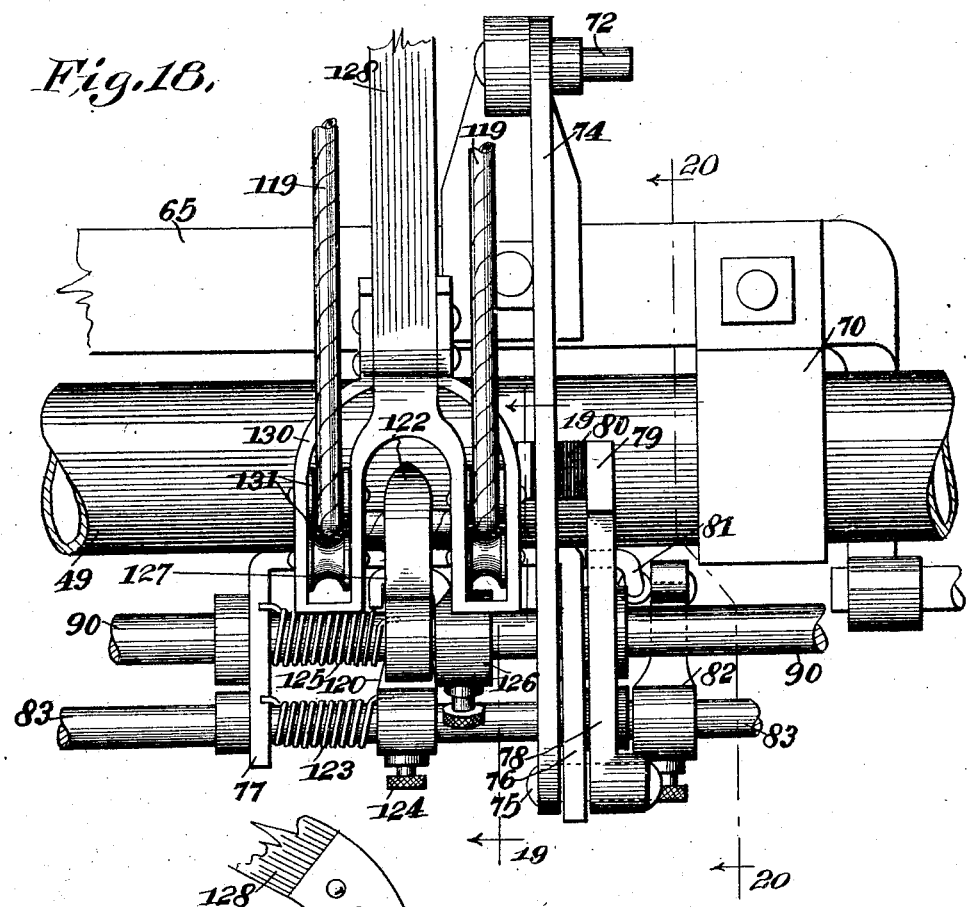

A stop 80, formed on the free end of the latch 78 and engaging behind the guide 74, as in Figures 18 and 20, keeps the latch from moving outwardly beyond the proper location of the beveled head 79 with respect to the slot 73. A link 81 joins the latch 78 with the link arm 82 on the secondary hook shaft 83. Disposed a short distance from the arm 82 on the shaft 83, is a pin arm 84, which carries a pin 85 occupying the slotted end 86 of the rod 87 pendent from the arm 88 of the pivoted rocker 89.

A primary hook shaft 90 is located above the shaft 83, both shafts being journaled in suitable bearings beneath the lower tube 49, the bracket arms 76, 77 forming the support for the rearmost ends of the shafts, while the foremost ends of the respective shafts are journaled in extensions of the bearings 62. These shafts, and cooperating parts of the mechanism related thereto, are more properly classed with the means for releasing the lower shock binding cords.

The primary hook shaft 90 carries a pair of hooks, designated 91 and 92, respectively located adjacent to the bearings 62 as shown in Figures 3, 12, 13, 14 and 15. These hooks normally receive and hold the bight of the lower cord or cable 93, which is formed into or provides two strands for binding the bottom of the shock, by reason of the separation of the hooks 91, 92 and the separated mountings 94 for the free ends on the lower cord fork 95.

Grooved cable pulleys 96, mounted on a pulley fork 97, guide the cable 93 and keep the strands separated as shown in Figures 12 and 15. Other grooved guide pulleys 98 (as shown in Fig. 23) in the pair of bottom curved arms 99, 100, also receive the cable strands 93, as clearly appears in the drawings, the guide pulleys 98 preferably being in double arrangement to keep the strands of the cable from slipping out of place.

A fork shaft 101 supports the fork 95 and the pulley fork 97. This shaft is a part of the shock form which is fully described under that heading below. Mounted on the erector crank 37, nearest the lower tube 49, is the cord or cable releasing cam 102, which includes the primary releasing lobe 103 and the secondary releasing lobe 104.

As shown in Figure 25, the lobe 104 is adjustable on the lobe 103 through the bolt and nut arrangement 105 which cooperates with the slot 106. The roller 107 of the pivoted rocker 89, already described, rides on the cam 102, and when the erector crank 37 and the U-form hanger 48 has reached the position in Figure 14, the primary releasing lobe 103 will have ridden beneath the roller 107 and shifted the rocker 89 sufficiently to remove the hook stop 108 from the abutment 109 of the adjacent hook 91 and thereby released the primary hook shaft 90.

Attached to the extension 110 of the other hook 92, is a spring rod 111 (shown in Figures 3 and 12), which slides in the stirrup 112 and carries the spring 113. The spring is fastened at one end to the stirrup and at the other end to the rod 111. The stirrup is suitably mounted on the telescopic rock rod 55. The spring 113 performs the double function of opening and closing the hooks 91, 92. In the present instance, the spring 113 acts to open the hooks 92 by rotating the primary hook shaft 90 in the proper outward direction when that shaft is released by the hook stops 108, as described above. The bight of the cable 93 is thus released and the bottom of the shock is unbound so that it can spread out to form a stable base. The position of the parts at this time is illustrated in Figure 14.

In releasing the lower cable 93, the hooks 91, 92 move a distance represented by the space between the dotted line position of the hook 91 in Figure 23 to the full line position thereof. When this position is arrived at, the shoulder 114 projecting to one side of the hook 91, as in Figures 12 and 23, is engaged and held by the lock 115. The lock 115 is pivoted at 116 to the extension of the adjacent bearing 62 and includes the lock trip 117, which is arranged to be engaged by the portion 118 of the adapter arm 99 on the return movement thereof, as appears below, to release the shoulder 114 from the lock 115 in another part of the operation.

The initial movement of the pivoted rocker 89 by virtue of the primary releasing lobe 103 of the cam 102, by which the abutment 109 was released, is ineffectual in moving the secondary hook shaft 83 in the clockwise direction, because such initial movement is taken up by the slot 86 above the pin 85 in Figure 20. In other words, the first movement of the rocker 89 effects only the hooks 91, 92 by releasing the primary shaft 90 to permit the shaft to turn, the continued movement of the rocker 89 by virtue of the secondary lobe 104, serving to rock the secondary shaft 83 in order to release the upper binding cords 119.

When the lobe 104 rides beneath the roller 107 of the pivoted rocker 89, the rod 87 in Figure 20 is moved downwardly sufficiently far to engage the pin 85 and rock the secondary hook shaft 83 in a clockwise direction, through the pin arm 84. This occurs when the shock form is in the final position in Figure 15, and two distinct acts then take place simultaneously.

First, the cable 119 is released, and secondly, the force arms 59, 60 and 66 are returned to the open position. The first act is accomplished by releasing the latch 120 from engagement with the lug 121 of the secondary cable hook 122 in Figures 12, 17, 18 and 19.

This clockwise movement of the latch 120 is against the tension of the spring 123. The ends of the spring are respectively fixed on the arm 77 and in the latch. The latch is adjustably fixed on the secondary shaft 83 by any suitable means 124. At the release of the lug 121, a spring 125, fixed between the arm 77 and the secondary hook 122 which is loose on the primary shaft 90, moves the hook 122 outwardly in the direction of the arrow $a$ in Figure 19 so as to release the cable 119, the bight of which is looped around the hook.

The upper part of the shock, then resting on the ground as in Figure 15, is released as indicated in that figure, so that the mechanism is free to proceed in the direction of the arrow $b$. Fixed adjacently to the loosely mounted hook 122 is a stop collar 126 with a back stop 127 behind the hook. The arrangement is clearly shown in Figures 18 and 19. The back stop 127 moves outwardly a short distance toward the secondary hook 122 when the shaft 90 is initially turned to release the primary cords or cables 93.

The second act, namely, of releasing the force arms 59, 60 and 66, happens at the same rocking of the pin arm 84 in Figure 20, whereby the latch 78 is pulled back by the link 81 and the latch pin 72 is released by the head 80. The spring 63 on the rock shaft 61, being under tension, then reverses the turning movement of the shaft 61 and causes the aforesaid arms to move back into the original or open position.

A single curved arm 128 cooperates with the single or secondary hook 122. This arm 128, like the curved arms 99 and 100 is loosely mounted on the shaft 129 of the shock form. The free end of the arm 128 carries a pulley saddle 130, in each member of which double pulleys 131 are mounted to receive and guide the strands of the cable 119.

Thence the cables run over cable guide pulleys 132 in the forks 133, and are attached to the upper cord fork 134. The cord fork 134 and the fork 133 are also loosely mounted on the fork shaft 101, in the same manner that the forks 95 and 97 of the cables 93 are mounted. The curved arms 99, 100 and 128 and the various associated forks, although described in connection with the various cable releasing means, require additional description in connection with the description of the shock form, which more particularly consists of that upper mechanism carried by the upper tube 50 of the hanger 48. Fixedly mounted at 135 and suitably braced at 137 on the upper tube 50 are three trusses respectively designated 138, 139 and 140.

Mounted in the alined extremities of these trusses is the fork shaft 101 and mounted substantially intermediately of the trusses is the shaft 129, both of which shafts are referred to in connection with Figure 12. Fastened to the lower cord fork 95, which is loose on the fork shaft 101, is the return spring 141, the other end of which is connected to the return arm 142 fast on the shaft 129.

Similarly connected to the upper cord fork 134 is the return spring 143, which is joined at the other end to the spring arm 144, also fast on the shaft 129. The return arm 142 has a pitman connection 145 to the long end of a bell crank 146 through the connecting link 147, the short arm of the bell crank ending in a lug 148 on which the trip latch 149 is pivoted at 150. As shown in Figure 26, the latch 149 includes the shoulder 151 and a projection 152.

Fixedly mounted at 153 on the mid-truss 139, is a stop bearing 154, which includes the sleeve 155 and a stop 156. The sleeve 155 first receives the sleeve 157 of the latch arm 158, the stud 159 of the bell crank 146 being then inserted through both and secured on the bottom by a suitable washer and nut connection.

Relative turning of the latch arm 158 and bell crank 146 is thus easily accomplished. Connected to the free end of the latch arm 158 is the spring 160, the other end of which is secured to the fixed bracket 161. The spring 160 pulls the latch arm 158 into engagement with the stop 156 of the stop bearing 154, and under other circumstances, is the means whereby the curved arms 99, 100 and 128 are returned to the normal empty position, through the bell crank and pitman connections 146 and 145.

Projecting to one side from the mid-truss 139 is an arm 162, to which one end of the pulley fork spring 163 is connected, the other end being connected to the fork arm 164 of the pulley fork 97. The purpose of the spring 163 is to return the pulley forks 97 and 133 to the normal location in Figures 3 and 5, when the upper cables 119 are released by the secondary hook 122, as above described.

Both pulley forks 97 and 133 are fast on the fork shaft 101, so that necessarily both forks move together and one must be released before either can move; that is to say, in the operation of the device, the upper pulley fork 133 is released last by the disconnection of the cables 119, whereupon the fork spring 163 operates to return both forks to the normal position. The lower and upper cord forks 95 and 134, being loose on the fork shaft 101, are separately moved to the normal upwardly directed positions, indicated for example, in Figures 3, 5 and 17, by the respective springs 141 and 143, already described.

It is easy to understand that when the respective cables 93, 119 are released, the lower and upper forks 95 and 133 spring upwardly to carry the cables out of the way.

Hingedly mounted at 165 to the fork arm 164 and extending rearwardly therefrom, is the limiting link 166, which includes the slotted head 167 occupied by the adapter shaft 129. Normally, the limiting link 167 is in the position shown in Figure 3, when it limits the upward movement of the pulley forks 97, 133 through the contracting action of the fork spring 163. Similarly, when in the other extreme position in Figure 4, the limiting link 167 limits the downward movement of the forks 97, 133, by virtue of the increasing weight of the shock in the shock form.

Operatively associated with the projection 152 of the trip latch 149 is the latch release 168, pivoted at 169 to the adjacent mid-truss 139, and including the release arm 170 which is located in the path of the incoming sheaves S, as shown for example in Figures 3 and 4. The purpose of the release 168 is to disengage the trip latch 149 from the arm 158.

When the last bundle or sheaf S is forced into the shock form, as is about to take place in Figure 7, the single force arm 66 in moving to the closed position in Figure 16, as described above, engages the pin 171 of the tension arm 172, which is loosely mounted on the adapter shaft 129. The arrangement is shown in Figures 2 and 16. A pulley 173 is mounted on the end of the pin 171, which enters the bracket 174, which is secured to the arm 172 and serves as a guard for a portion of the tension cable 175.

The ends of this cable are respectively connected to an arm 176, fixed on the fork shaft 101, and to the single arm 128 as at 177 in Figure 16. Fixed on the upper tube 50 of the U frame hanger 48, is the pulley bracket 178, which carries the pulley 179, over which the tension cable 175 runs, and includes the bracket 180 to which one end of the tension spring 181 is connected.

Connection of the other end of the tension spring 181 is had to the tension arm 172, the purpose of this spring being to pull the arm 172 up against the upper tube 50 when released by the force arm 66. It is by means of the tension arm 172 and the cable 175, that the upper part of the shock now completed in the shock form, is additionally tightened before the form is turned over. This tightening action is accomplished by the movement of the single force arm 66.

As this tightening act occurs, a return spring 182 is put under tension. One end of the spring is connected to the single adapter arm 128, the other end being connected to the forward arm 183 of an arm bracket 184, which includes the rear arm 185. The arm bracket 184 is fixedly connected to the adapter shaft 129 at 186 in Figure 13.

Connected between the rear arm 185 and the tension cable 175 is a cable spring 187, the purpose of which is to return the tension cable and take up slack therein. The arm bracket 184 is so shaped at 188 to accommodate the set screw 189, which engages the single curved arm 128 in returning said arm to the normal closed position by virtue of the turning of the shaft 129 through the contraction of the spring 160, described above.

The operation is described below in reverse order to the description above; that is to say, the operation here described, begins with filling the shock form, showing the various acts that take place from the beginning, starting from the time when the shock form has been returned to the shock receiving position and the curved arms 99, 100 and 128 are still in the position in Figure 16.

Assume first that the shock form has just returned to the filling position; the alined curved arms 99, 100 and 128 will still be in the open position designated in Figures 7 and 16, but it must be borne in mind that Figure 16 is a view showing the shock form in the horizontal relationship to the ground as in Figure 15, and is not intended to show the parts in the starting position because at the time the shock form is empty. Consider the spring 160 in Figure 2 to be greatly stretched.

When the spring 160 contracts from the stretched position, the bell crank 146 is moved on its pivot 159 in a clockwise direction in Figure 2, by virtue of the trip latch 149 which is then in engagement with the arm 158. Accordingly, the pitman 145 moves the return arm 142 outwardly, rocking the curved shaft 129 and moving the curved arms 99, 100 and 128 to the position in Figure 17, which shows the position of these arms at the moment that they are returned. The curved arms 99, 100 are fixed on the shaft 129, but the single curved arm 128 is loose. This arrangement is necessary because the arms 99, 100 move together, whereas the single curved arm 128 has a slight independent movement with respect to the shaft 129 when the sheaf shock tightening function in Figure 16 occurs. The arm bracket 184 being fixed on the shaft 129 and moving therewith, causes the single curved arm 128 to move inwardly to the closed position with the arms 99, 100.

Up to this time the hooks 92, 91 and 122 are open, as shown for example in the case of the hook 91 in Figure 23. The curved arms move inwardly. The end of the curved arm 99 strikes the lock trip 117 in Figure 23, disengaging the lock 115 from the shoulder 114 of the hook 91, whereupon the primary hook shaft 90 is rotated in the clockwise direction by the action of the spring 113 in Figure 12, causing the hooks 91, 92 to move to the closed position. Since the ends of the arms 99, 100 carry the cable 93, the hooks 91, 92 move up behind the bight of the cable and secure the latter in the shock receiving position.

Figure 19:
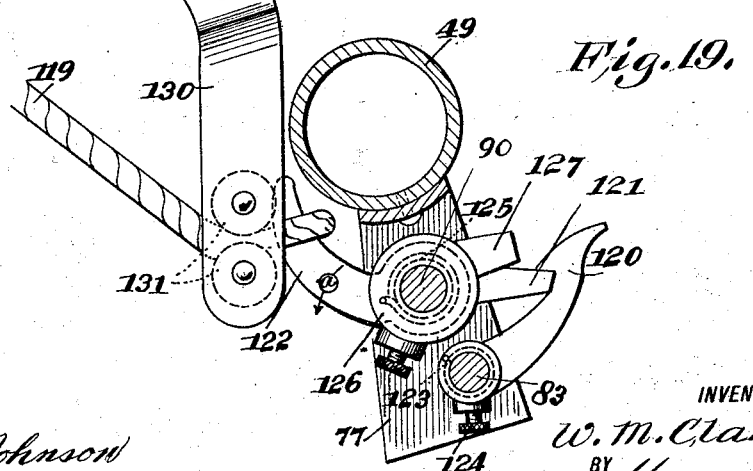

The hook 122 moves to the closing position at the same time, and since the end 130 of the arm 128 also carries the cable 119, the bight of the cable is caught by the hook 122 as clearly shown in Figure 19. The hook 122 is turned to the closed position against the tension of the spring 125 in Figure 18, by the stop member 127, it being remembered that the hook 122 is loose on the shaft 90, but the stop member 127 is fixed on the collar 126.

The shock form is now in position to receive a new shock. At this time, the adapter arms are positioned as in Figures 3, 5 and 17, the various cables 93 and 119 (Fig. 12) being stretched taut by virtue of the springs 141, 143 in Figure 2. These springs are respectively connected to the lower and upper forks 95, 134, which at this time stand off from the pulley forks 97, 133. The filling operation now commences.

As each bundle passes down the chute 2 and is bound by the needle 12, the tripping ratchet 21 is advanced the distance of one tooth by the striking of the heel 13 against the pawl arm 14. The trip pin 25 moves toward the heel 27 of the trip arm 28 with a step-by-step motion, until it finally engages the heel, rocks the trip arm, and pulls the connection 29.

Normally, the initiator and crank gears 33, 35 are stationary. This is because the drive pawl 31 on the gear 33 is out of engagement with the teeth 39 of the continuously rotating drive ratchet 38. However, as soon as the holding lug 30 is displaced by the movement of the trip arm 28, the drive pawl 31 engages the teeth 39 as in Figure 10, locking the gears 38, 33 together and causing the stub shaft 36, and consequently the erector crank 37, to move.

It has been fully explained above how the capacity of the shock form can be adjusted by inserting the trip pin 25 in any one of a plurality of openings 26 in the ratchet 21. It is easy to see that the farther back the trip pin 25 is located initially the greater will be the number of actuations of the ratchet 21 before the heel 27 will be engaged. It has also been fully explained in connection with Figures 13, 14 and 15, how the first part of the motion of the shock form is comparatively slow, but when the shock form reaches the position in Figure 14, the motion is suddenly accelerated so that the shock is firmly set on the ground by jamming the ends down, so as to obviate the possibility of the shock turning over.

This variable motion of the shock form is obtained by mounting the initiator and erector gears 33, 35 eccentrically, and it is thought that the operation can be easily followed without further explanation. The force arms 59, 60 are closed as the form moves from the position in Figure 13 to that in Figure 14. The throat of the form is shown open in Figure 13, but closed in Figure 14.

As the telescopic rock rod 55 stretches out in following the shock form now in the act of erecting, the force arm 59, to which the rod 55 is connected, is moved upwardly, putting the spring 63 under tension. Since the arm 60 is carried by the shaft 61 of the arm 59, it follows that both arms must move together. The same is true of the third and single force arm 66, which is separately mounted on the bar 65 which is rotatable on the lower tube 49, but has connection to the force arm 60 through the link 67 and arm 69. The shock is thus crowded in.

Releasing the lower cables 93, 93 is the act next in order. This occurs when the shock form reaches the position in Figure 14. It is brought about by the riding up of the roller 107 of the pivoted rocker 89 on the primary releasing lobe 103 of the cam 102 on the erector crank 37.

Upon rocking as described, the hook stop 108 of the rocker 89, disengages the abutment 109 of the hook 91 in Figure 12, freeing the primary shaft 90 to be rotated outwardly in a counter clockwise direction by the spring 113. This movement of the shaft 90 has no effect on the single hook 122. The cables 93, 93 are released by the outward movement of the hooks 91, 92 and thus the bottom of the shock is permitted to spread out into a large and ample base. The hooks 91, 92 are held in this open position by the lock 115 in Figure 23, until the lock trip 117 is tripped by the curved arm 99 in the closing movement.

As the initial rocking motion of the rocker 89 occurs, the upper end of the slot 86 of the pendent rod 87 on the rod 88 of the rocker, approaches the pin 85 of the pin arm 84 in Figure 20. However, the initial movement of the rocker 89 is insufficient to effect the secondary hook shaft 83 on which the pin arm 84 is mounted. But when the form has reached the final position in Figure 15, the cam 102 will have moved far enough so as to bring the secondary lobe 104 beneath the roller 107, so that the rocker is moved still farther and the pin arm 84 is shifted downwardly by virtue of the engagement of the pin 85 by the top of the slot 86.

The secondary shaft 83 being turned backwardly, simultaneously causes the release of the latch pin 72 in Figure 20, and the lug 121 in Figure 19. When the latch pin 72 is released by the head of the latch 78, which is joined to the shaft 83 by the members 81, 82, the force arms 59, 60 and 66 return instantly to the original open positions by the action of the spring 63 on the shaft 61. When the lug 121 is released by the latch 120, the hook 122 is turned by the action of the spring 125 until it strikes the stop 127.

Thus the upper cable 119 is released and the top of the shock is freed so that the machine proceeds in the direction $b$ in Figure 15, empty. The erector crank 37 continues to turn until it reaches the original position, during which turning the various rods 53, 55 and 57 operate to place the shock form in the receiving position.

Surplus bundles are taken care of by the depressible table 190, in Figures 5 and 24, in case a bundle should be discharged while the machine is in the shock setting up act. The depressible table is normally held up as in Figure 5, by the heel of the erector crank 37, but as the crank moves away in the setting up act, the table 190 drops down due to its weight, forming a receptacle for a bundle.

The table is supported by a toggle link arrangement 191, the respective links being pivoted at 192, 193 to the table and frame 4, the same links being slidable at 194, 195 on the frame and table as shown. When the shock form returns from the setting up act, the crank 37 will again raise the table 190, and when another bundle is discharged behind the bundle just raised with the table 190, both bundles will be forced into the shock form by the action of the pusher 17.

The final act which completes the foregoing operation of setting up a shock and returning the shock form, occurs when the drive ratchet 38 has made a full revolution, whereupon the free end of the drive pawl 31 in Figure 10 strikes the lug 30, which as shown in Figure 9 has an end projecting into the path of the pawl 31. This causes the pawl 31 to rock on its fulcrum 32 and disengage from the teeth 39 of the ratchet 38, thus stopping the rotation of the shaft 34.

In the event that the binder is binding a bundle as the drive ratchet 38 approaches the end of a complete revolution, the pawl 31 then standing substantially in the dotted line position in Figure 10, will strike the lug 43, as shown, and permit the bundle binding operation to be completed. When the next bundle is discharged and the heel 13 of the needle 12 again strikes the pawl arm 14, the stop lug 43 is moved aside by the consequent pulling of the connection 44, so that the drive pawl can fall to rest against the holding lug 30, until that lug is in turn displaced by the connection 29 leading to the trip arm 28.

Provision is made for making certain adjustments so that both long and short grain can be handled by the machine. Those parts of the mechanism on the shafts 101, 129 carrying the cables 119 and situated below the arm 60 in Figure 2, are moved over in the direction of the arm 60 so as to bring the aforesaid parts closer. It can then be readily understood that by such adjustment, shorter grain can be handled. Conversely, if the same parts are moved farther away from the arm 60, then longer grain can be handled.

While the construction and arrangement of the improved sheaf shocker as herein described and claimed, is that of a generally preferred form, obviously modifications and changes may be made without departing from the spirit of the invention or the scope of the claims.

I claim:—

1. In a sheaf shocker, a shock form comprising swinging curved arms, means by which they are swingably mounted, and tautly mounted binding cables, operatively associated with the describing ends of said arms to increase the capacity of the form as the size of the shock increases.

2. A sheaf shocker, comprising a form automatically adaptable to the increasing number of bundles, including normally stretched binding cables, means keeping them under tension and permitting them to yield, and yieldably mounted curved arms with describing ends paying out the cables to gradually encompass the shock.

3. A sheaf shocker, comprising a form including outwardly swinging arms, means normally keeping them in the inward closed position, stretched binder cables gradually traversed by the ends of the arms as the size of the shock increases, and means keeping the cables under tension.

4. In a sheaf shocker, resiliently mounted outwardly swingable curved arms normally assuming an inward closed position, shock binding cables traversible by the ends of the curved arms as the size of the shock increases, resiliently mounted projecting guide means for the cables, and resiliently mounted fastening means for the adjacent cable heads gradually approaching the guide means as the arms move outwardly and the weight of the shock on the then supporting cables increases.

5. In a sheaf shocker, swingably mounted curved arms with resilient retaining means, binding cables traversed by the arm ends as the shock expands, with resilient means keeping the cables under tension; operatively associated closure means and means for applying pressure to the shock in addition to that exerted by the aforesaid resilient means, actuated by said closure means.

6. In a sheaf shocker, means for applying pressure to the shock during and after formation, comprising a form with outwardly swingable curved arms with resilient retarding means, stretched cables traversed by the outwardly swinging arms, with resilient means keeping the cables under tension; automatically operated closure means for the entrance to the form, and additional pressure producing means automatically actuated by said closure means to additionally compress the shocks as the form is set up.

7. In a sheaf shocker, a shock form, means for moving the shock form to the setting up position when filled, form entrance closure means, means to move said closure means to the closing position by an associated part of the form during its movement, and resiliently mounted movable means engageable by said closure means to automatically apply pressure to the shock to press the tops of the bundles together.

8. In a sheaf shocker, a shock form, means for moving the shock form to the setting up position when filled, form entrance closure means, means to move said closure means to the closing position by an associated part of the form during its movement, resiliently mounted movable means engageable by said closure means to automatically apply pressure to the shock to press the tops of the bundles together, a yieldably mounted flexible member included in said means.

9. In a sheaf shocker, a shock form, means for moving the shock form to the setting up position when filled, form entrance closure means, means to move said closure means to the closing position by an associated part of the form during its movement, resiliently mounted movable means engageable by said closure means to automatically apply pressure to the shock to press the tops of the bundles together, a yieldably mounted flexible member included in said means, and means for retracting said flexible member when the function thereof is performed.

10. In a sheaf shocker, a shock form, means for applying pressure to the top of a shock in the form, comprising a spring-retracted tension arm, associated with the form, a normally retracted tension cable cooperating with the arm, and bundle entrance closure means engaging the arm in closing to move said arm and cable inwardly around the shock.

11. In a sheaf shocker, a shock form, means for applying pressure to the top of a shock in the form, a spring-retracted tension arm associated with the form, a normally retracted pressure cable cooperating with the arm, bundle entrance closure means engaging the arm in closing to move said arm and cable inwardly around the shock, and resilient means attached to the cable for taking up slack and retracting it when the tension arm is released.

12. In a sheaf shocker, a shock form, means for applying pressure to the top of a shock in the form, a spring-retracted swingable tension arm, associated with the form and having a pin and roller; a resiliently mounted tension cable guided over the roller, and form entrance closure means including a force arm engaging the pin to move the tension arm and cable inwardly to compress the top of the shock.

13. In a sheaf shocker, a normally horizontally positioned shock form, means for moving said form into the setting up position, and operatively associated means causing the form to move in a direction perpendicular to the ground in the latter part of the setting up movement.

14. In a sheaf shocker, a form, means for rotating said form into a vertical shock setting up position from a normal horizontal filling position, and a relatively fixedly mounted connection joining the form causing it to traverse a path perpendicular to the ground in the final setting up movement.

15. In a sheaf shocker, a normally horizontally positioned form, means for moving it into a vertical setting up position, and a form tilting rod causing the form to traverse a path perpendicular to the ground in the latter part of the setting up motion.

16. In a sheaf shocker, a form having an erector crank, means for rotating the crank to move the form into a setting up position, a form hanger carried by but mounted on the crank for a slight relative turning, and connected means effecting such slight relative turning in the final part of said shock setting up movement of the crank, causing the form hanger to traverse a path perpendicular to the ground.

17. In a sheaf shocker, a shock form having an erector crank, means for rotating the crank to move the form into a shock setting up position, a form hanger, a portion associated with the hanger fitting on the crank to carry the form but permit slight relative turning, and a tilting rod joined to said portion and arranged to effect said slight relative turning in the latter part of the setting up movement, causing the hanger to traverse a path perpendicular to the ground.

18. In a sheaf shocker, an erector crank, a form hanger carried by but mounted on the crank for slight relative turning, means for imparting a substantially uniform initial rotational movement to the crank in erecting the form hanger but causing the movement of the hanger to be accelerated in the latter part, and means causing the hanger to traverse a path perpendicular to the ground in said latter part.

19. In a sheaf shocker, an erector crank, a form hanger carried by but mounted on the crank for slight relative turning, eccentrically mounted drive gears initially rotating the crank and form hanger to the setting up position with a slow motion, but accelerating said movement in the final part, and means including a suitably connected tilting rod effecting said turning in the final part of the movement to cause the hanger to traverse a path perpendicular to the ground.

20. In a sheaf shocker, a shock form having an entrance, means for moving the shock form into the setting up position when filled, and means automatically actuated by virtue of said movement to force in a last bundle and close the entrance to the form.

21. In a sheaf shocker, a shock form having an entrance, means for moving the shock form into the setting up position when filled, normally open entrance closure means, and permanently connected jointed means automatically actuating said closure means by virtue of the setting up movement, to force in a last bundle and close the form entrance.

22. The combination, of an erectible form, means for erecting the shock form to the setting up position when filled, means to close an entrance in the shock form, means for automatically actuating said closure means during the erection of the form, and means operatively associated with said actuating means for diverting the path of movement of the form toward the completion of the erection.

23. The combination, of a shock form rotatable means for erecting the shock form to the setting up position when filled, means to close a normally open entrance in the shock form, an end connected but mid-jointed rod automatically actuating the closure means by virtue of the rotational movement of said rotatable means to force in a last bundle and close the form entrance, and means including a tilting rod joining a portion of the form and said rod, causing the final movement of the form to take a direction perpendicular to the ground.

24. The combination, of a shock form having an entrance, means for moving the shock form from a filling position to a discharging position, normally open entrance closure means, and means for actuating said closure means to force in a last bundle and close the entrance in the aforesaid form movement.

25. In a sheaf shocker, a shock form having a form entrance, means for moving the shock form from a filling to a discharging position, normally open closure means including companion force arms, connected actuating means for automatically moving the closure means to force in the last bundle and close the form entrance by the movement of the form, and an additional force arm with suitable conections to said closure means, causing all to act together.

26. In a sheaf shocker, a shock form having a form entrance, means for moving the shock form from a filling to a discharging position, normally open closure means including companion force arms, connected actuating means for automatically moving the closure means to force in the last bundle and close the form entrance by the movement of the form, an additional force arm with suitable connections to said closure means, causing all to act together, and means associated with the closure means for automatically opening all of the arms at the proper time.

27. In a sheaf shocker, a form, a form hanger, means for moving the hanger and form to a setting up position when filled, entrance closure means for the form automatically actuated when the form moves to said setting up position, a force arm rotatably mounted on the hanger, and arm and link connections between the closure means and force arm causing both to move together.

28. In a sheaf shocker, a form, a form hanger, means for moving the hanger and form to a setting up position when filled, entrance closure means for the form automatically actuated when the form moves to said setting up position, a force arm rotatably mounted on the hanger, arm and link connections between the closure means and force arm causing both to move together, and a return spring automatically reopening the closure means and force arm in a later part of the operation.

29. In a sheaf shocker, a shock form, including a hanger; normally open closure means, with suitable bearings carried by the hanger, a single force arm, with mounting means rotatably applied to the hanger, and arm and link connections between said means and the closure means, causing both to operate together in two directions.

30. In a sheaf shocker, a plurality of force arms movable into an operative position, means for moving the force arms into said operative position, and latch means operatively associated with one of the arms for holding all in said position.

31. In a sheaf shocker, independently mounted but operatively connected force arms, means moving them into an operative position, and latch means operatively associated with one of the arms for holding all in said position until said means is released.

32. In a sheaf shocker, a shock form having an entrance means for closing the shock form entrance including normally open closure means, a normally open force arm, and suitable connections between the two; means for actuating the closure means and force arm simultaneously, and a suitable latch operatively associated with the force arm for receiving parts thereof when the entrance closure is effected thereby.

33. In a sheaf shocker, a shock form having an entrance means for closing the shock form entrance including normally open closure means, a normally open force arm, and suitable connections between the two; means for actuating the closure means and force arm simultaneously, a suitable latch operatively associated with the force arm for receiving parts thereof when the entrance closure is effected thereby, and a return spring operatively associated with the closure means causing the return of said parts when said latch is released.

34. In a sheaf shocker, a closure gate, a force arm, suitable connections between the two causing both to move to the closing position, a suitable guide, means carried by the force arm operatively associated with the guide, and latch means displaceable by said means to be held by the latch means until released.

35. In a sheaf shocker, a closure gate, a force arm, suitable connections between the two causing both to move to the closing position, a suitable guide, means carried by the force arm operatively associated with the guide, latch means displaceable by said means to be held by the latch means until released, suitable means for releasing said latch means when required, and a return spring operatively associated with the gate for re-opening it and the force arm.

36. The combination in a sheaf shocker, of a relatively fixed guide, a movable force arm with a pin operatively associated with the guide, and a latch mounted on the guide to be displaced by the pin and hold the force arm until the latch is actuated to release the pin.

37. The combination in a sheaf shocker, of a closed gate, with a re-opening spring under tension, an operatively associated force arm with a pin, a relatively fixed guide operatively receiving the pin, a latch previously displaced by the pin and holding the force arm and gate closed, and means for moving the latch to release the pin whereupon the spring re-opens the gate and force arm.

38. The combination in a sheaf shocker, of a form hanger, a lower tube carried thereby, an arcuate slotted guide carried by the tube, a force arm on a bar having collars encircling the tube, by which the arm is mounted, the arm having a pin in the guide; and a latch pivoted on the guide, with a beveled holding head engaged and displaced by the pin to be held, and having a stop engaging the guide.

39. In a sheaf shocker, an erector crank having an associated shock form with a form entrance, means for moving the shock form to a setting up position when filled, a normally open gate and force arm having connections movable to the form entrance closing position during said setting up movement of the form, means for maintaining said closed position including a pivoted latch and an engageable pin on the force arm; and a releasing cam on the crank with suitable operating connections to the latch to release the pin near the end of the setting up movement.

40. In a sheaf shocker, a shock form, an erector crank therefor, means for actuating the said crank to move the form to the setting up position when filled, a gate with a connected force arm automatically movable to the closed position during said setting up movement of the form, a relatively fixed slotted guide receiving a pin on the force arm and having a latch for catching the pin to hold the gate and force arm closed, a cam on the crank, and a rocker with suitable connections to the latch, initially ineffective to release the latch but operating to release the latch during the final setting up movement so as to free the pin, force arm and gate.

41. In a sheaf shocker, a shock form, an erector crank therefor, means for actuating the crank to move the form to a setting up position when filled, a gate with a connected force arm automatically movable to the closed position during said setting up movement of the form, a relatively fixed slotted guide receiving a pin on the force arm and having a latch for catching the pin to hold the gate and force arm closed, a cam on the crank, a rocker with suitable connections to the latch, initially ineffective to release the latch but operating to release the latch during the final setting up movement so as to free the pin, force arm and gate, and means for reopening the gate and force arm when thus released.

42. In a sheaf shocker, a shock form, means for moving the form to a setting up position when filled, binding cables, normally operative gripping means for the cables, and means actuated by a moving part of the form for automatically releasing the cables at the proper time when moving in the setting up act.

43. In a sheaf shocker, a form having a rotatable part and including shock binding cables, means for rotating the form to the setting up position; means including hooks normally gripping the cables, means normally holding the hooks in the gripping position, and means including a cam carried by said rotatable part of the form for actuating said means to release the hooks and cables during the setting up act of the form.

44. A sheaf shocker, comprising a shock form, means for moving the form to a setting up position when filled, upper and lower shock binding cables, gripping means for each cable; and means actuated upon the erection of the form to release the lower cable gripping means and enable the bottom of the shock to spread out.

45. A sheaf shocker, comprising a shock form, means for moving the form to a setting up position when filled, upper and lower shock binding cables, gripping means for each cable; means actuated upon the erection of the form to release the lower cable gripping means and enable the bottom of the shock to spread out, and subsequently operative means for releasing the upper cable to free the shock at the end of the erection.

46. A sheaf shocker, comprising a shock form, with means for slowly rotating it to the erect position from a normal filling position, and then accelerating the movement in a path perpendicular to the ground to set up the shock; upper and lower shock binding cables, gripping means for each, and instrumentalities including cam actuated means for initially releasing the lower cable when the form is erected permitting the bottom of the shock to spread out, and secondarily releasing the upper cable when the shock is on the ground.

47. In a sheaf shocker, an erectable shock form, a crank supporting the form and in respect to which the form is relatively movable, means for rotating the crank, a cable binding the bottom of the shock, tension-opposed gripping means for the cable, with means for retaining the gripping means against the tension; and means, including a cam, carried by a part of the form and operating during said relative turning to actuate the retaining means to release the gripping means and cable when the form is erected.

48. In a sheaf shocker, a shock form including a lower binding cable, means to erect the form to a setting up position when filled, normally active cable gripping means including a tension-opposed shaft with hooks, means normally retaining the hooks against tension, and actuating means therefor including a cam carried by the form displacing the retaining means to release the hooks and cable when the form arrives at the setting up position.

49. In a sheaf shocker, a shock form, means for rotating the shock form to the setting up position when filled, a shock binding cable; normally operative cable gripping means including a shaft with hooks, and a spring pressing against the hooks; retaining means including a hook stop preventing the spring from opening them, and means, including a cam carried by the form, becoming active when the setting up position is arrived at, to displace the retaining means and free the hooks and cable.

50. A sheaf shocker, comprising a shock form, means for rotating the shock form rotatable to a setting up position when filled, upper binding cables and a lower binding cable; normally operative independent gripping means for said cables including a hook for the upper cables and a shaft-mounted spring-pressed hook for the lower cable; a second shaft with a latch retaining the upper hook, and means for successively releasing the lower and upper hooks, including a rocker, a cam for actuating the rocker, a stop for initially releasing the lower hook and cable, and a connection to the second shaft for subsequently actuating the latch and releasing the upper hooks and cables, both actions occuring in the setting up position.

51. In a sheaf shocker, primary and secondary hook shafts, a spring-opened hook loose on the primary shaft, with a retaining latch on the secondary shaft; a lower hook fixed on the primary shaft, with an opening spring; and an operatively associated cam-actuated rocker including an initially removed stop to free the fixed hook for opening by its spring, and a slotted link connection to an arm on the secondary shaft, for subsequently moving the latch to release its hook, upon continued shifting of said rocker.

52. In a sheaf shocker, a cable gripping hook, with a spring pressing it open; a stop normally positioned to retain the hook, a cam actuatable to release the hook, and a lock catching and holding the hook open, including a subsequently engaged lock trip to again release the hook and permit the spring to close it.

53. The combination in a sheaf shocker, of a primary hook shaft, an upper hook loosely mounted on the shaft spring-held in the open position, a back stop fixed on the shaft to move the hook into the closed position upon rotation of the shaft, and a secondary spring-rotated hook shaft, with a latch for engaging a portion of the hook and holding it in the closed position.

54. In a sheaf shocker, a shock form including a force arm movable to a closed position, means for moving the force arm to a closed position, a pin on the force arm, a relatively fixed slotted guide receiving said pin, a latch retaining the pin, a hook shaft with a link connection to the latch, and a normally operative hook lock; means for moving the shaft and simultaneously shifting the lock and latch and a cam for actuating said shaft-moving means.

55. A sheaf shocker, comprising a form in position to be filled, form supporting and erecting means including an erector crank, and means for temporarily receiving a surplus bundle while the form is in the erecting act, including a crank-supported table arranged to lower upon movement of the crank to provide a recess.

56. A sheaf shocker, means to perform the function set forth therein, including a shock form erecting crank, and a table normally supported by the crank, but suitably mounted for depression when released by the crank in the form erecting movement, thereby providing a recess for accommodating a surplus bundle.

WILLIAM MORGAN CLARK.